(12) United States Patent
Sun et al.

(10) Patent No.: US 11,889,240 B2
(45) Date of Patent: Jan. 30, 2024

(54) IMAGE DEVICE AND OPERATION METHOD OF IMAGE DEVICE

(71) Applicant: SAMSUNG ELECTRONICS CO., LTD., Suwon-si (KR)

(72) Inventors: Minkyu Sun, Suwon-si (KR); Se-Hwan Yun, Hwaseong-si (KR); Geon Gi, Suwon-si (KR)

(73) Assignee: Samsung Electronics Co., Ltd.

( * ) Notice: Subject to any disclaimer, the term of this patent is extended or adjusted under 35 U.S.C. 154(b) by 161 days.

(21) Appl. No.: 17/443,793

(22) Filed: Jul. 27, 2021

(65) Prior Publication Data

US 2022/0182589 A1   Jun. 9, 2022

(30) Foreign Application Priority Data

Dec. 4, 2020   (KR) .................... 10-2020-0168578

(51) Int. Cl.
| | | |
|---|---|---|
| *H04N 9/64* | (2023.01) | |
| *G06T 7/80* | (2017.01) | |
| *G06T 5/40* | (2006.01) | |
| *G06T 3/40* | (2006.01) | |
| *G06T 5/50* | (2006.01) | |

(52) U.S. Cl.
CPC .......... *H04N 9/646* (2013.01); *G06T 3/4038* (2013.01); *G06T 5/40* (2013.01); *G06T 5/50* (2013.01); *G06T 7/80* (2017.01); *G06T 2207/20021* (2013.01); *G06T 2207/20224* (2013.01)

(58) Field of Classification Search
CPC .......... H04N 9/64; H04N 9/646; H04N 23/84; H04N 23/843; H04N 25/13; H04N 25/134; H04N 25/11; H04N 25/46; G06T 3/40; G06T 3/4038; G06T 5/40; G06T 5/50; G06T 7/80; G06T 2207/20021; G06T 2207/20224; G06T 3/4015
See application file for complete search history.

(56) References Cited

U.S. PATENT DOCUMENTS

| | | | |
|---|---|---|---|
| 9,179,113 B2 | 11/2015 | Tachi | |
| 9,219,870 B1 * | 12/2015 | Mills | .................... H04N 25/447 |
| 9,287,316 B2 * | 3/2016 | Mlinar | .............. H01L 27/14685 |
| 10,225,495 B2 | 3/2019 | Lee et al. | |
| 10,281,415 B2 * | 5/2019 | Inoue | .................... H01J 37/222 |
| 10,313,609 B2 * | 6/2019 | Fu | .................... H01L 27/14621 |
| 10,321,022 B2 | 6/2019 | Hata | |
| 10,638,060 B2 | 4/2020 | Liu et al. | |

(Continued)

*Primary Examiner* — Bobbak Safaipour
*Assistant Examiner* — Benedict E Lee
(74) *Attorney, Agent, or Firm* — Fish & Richardson P.C.

(57) ABSTRACT

An imaging device includes a pre-processing module that generates a first image by performing a binning operation in a first mode and generates a second image by performing a remosaic operation in a second mode; a calibration module that generates calibration data based on a first image and a second image, the calibration data including a code level difference of the first image and the second image for each of a plurality of colors by a grid unit; and a compensation module that generates a calibration image by decoding the calibration data, and generates a compensated second image associated with a raw image by summing the second image associated with the raw image and the calibration image to compensate for a color tone difference between the first mode and the second mode by the grid unit.

17 Claims, 23 Drawing Sheets

(56) References Cited

U.S. PATENT DOCUMENTS

| | | |
|---|---|---|
| 10,681,271 B2* | 6/2020 | Suitoh .................. H04N 23/698 |
| 2012/0147205 A1* | 6/2012 | Lelescu ................ H04N 13/106 |
| | | 348/E5.024 |
| 2016/0077329 A1 | 3/2016 | Matsumoto et al. |
| 2017/0206842 A1* | 7/2017 | An ........................ G09G 3/3291 |
| 2018/0077369 A1* | 3/2018 | Sun ........................ H04N 25/68 |
| 2020/0184598 A1 | 6/2020 | Jiang et al. |
| 2020/0241826 A1* | 7/2020 | Srinivasan ............ G06F 3/1431 |

\* cited by examiner

IMAGE DEVICE AND OPERATION METHOD OF IMAGE DEVICE

CROSS-REFERENCE TO RELATED APPLICATIONS

A claim of priority under 35 U.S.C. § 119 is made to Korean Patent Application No. 10-2020-0168578 filed on Dec. 4, 2020, in the Korean Intellectual Property Office, the entirety of which is hereby incorporated by reference.

BACKGROUND

The present disclosure relates to imaging devices, and more particularly imaging devices and operation methods of imaging devices.

Image sensors may be classified as charge coupled device (CCD) image sensors, or complementary metal-oxide semiconductor (CMOS) image sensors (CIS). CMOS image sensors include pixels composed of CMOS transistors and convert light energy to an electrical signal using a photoelectric conversion element included in each pixel. CMOS image sensors obtain information of a captured/photographed image using the electrical signal generated by each pixel.

As the number of pixels increases and pixel size is reduced, various pixel arrays and various processing techniques are being developed to optimally operate an image sensor in high-illuminance environments and low-illuminance environments. For example, in a high-illuminance environment an image of a full size is provided using a sufficient amount of light. However, in a low-illuminance environment an image reduced in size is provided using a method such as binning. In a low-illuminance environment, a difference between color tones of the image of the full size and the image reduced in size easily occurs by using the binning.

SUMMARY

Embodiments of the inventive concepts provide an imaging device that improves a color tone difference of an image generated in a first mode and an image generated in a second mode, and an operation method of the imaging device.

Embodiments of the inventive concepts provide an imaging device including a pre-processing module that generates a first image by performing a binning operation based on a raw image in a first mode and generates a second image by performing a remosaic operation based on the raw image in a second mode; a calibration module that generates calibration data based on a first image associated with a first raw image and a second image associated with a second raw image, the calibration data including a code level difference of the first image and the second image for each of a plurality of colors by a grid unit; and a compensation module that receives the second image associated with raw image, generates a calibration image by decoding the calibration data, and generates a compensated second image associated with the raw image by summing the second image associated with the raw image and the calibration image to make compensate for a color tone difference between the first mode and the second mode by the grid unit.

Embodiments of the inventive concepts further provide an operation method of an imaging device that includes an image sensor and an image signal processor, the image sensor including a pre-processing module, and the image signal processor including a calibration module and a compensation module. The operation method includes generating, by the pre-processing module, a first image by performing a binning operation based on a raw image in a first mode and a second image by performing a remosaic operation based on the raw image in a second mode; receiving, by the compensation module, the second image associated with the raw image; loading, by the compensation module, the calibration data, the calibration data including a code level difference of a first image and a second image for each of a plurality of colors by grid units; decoding, by the compensation module, the calibration data to generate a calibration image; and summing, by the compensation module, the second image associated with the raw image and the calibration image to generate a compensated second image associated with the raw image so that a color tone difference between the first mode and the second mode is compensated by the grid unit.

Embodiment of the inventive concepts still further provide an operation method of an imaging device including generating, by a pre-processing module, a first image by performing a binning operation based on a raw image in a first mode and a second image by performing a remosaic operation based on the raw image in a second mode; receiving, by a calibration module, a first image associated with a first raw image and a second image associated with a second raw image; generating, by the calibration module, a plurality of calibration data based on the first image and the second image, the plurality of calibration data including a code level difference of the first image and the second image for each of a plurality of colors by a grid unit; storing, by the calibration module, the plurality of calibration data in a memory; receiving, by a compensation module, the second image provided from the pre-processing module; loading, by the compensation module, the plurality of calibration data stored in the memory; decoding the plurality of calibration data to generate a calibration image; and generating a compensated second image associated with the raw image so that a color tone difference between the first mode and the second mode is compensated by the grid unit, based on the calibration image and the second image.

BRIEF DESCRIPTION OF THE FIGURES

The patent or application file contains at least one drawing executed in color. Copies of this patent or patent application publication with color drawing(s) will be provided by the Office upon request and payment of the necessary fee.

The above and other objects and features of the inventive concepts will become apparent in view of the following detailed description of embodiments made with reference to the accompanying drawings.

DETAILED DESCRIPTION

As is traditional in the field of the inventive concepts, embodiments may hereinafter be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software (e.g., executable instructions stored in a memory device). The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
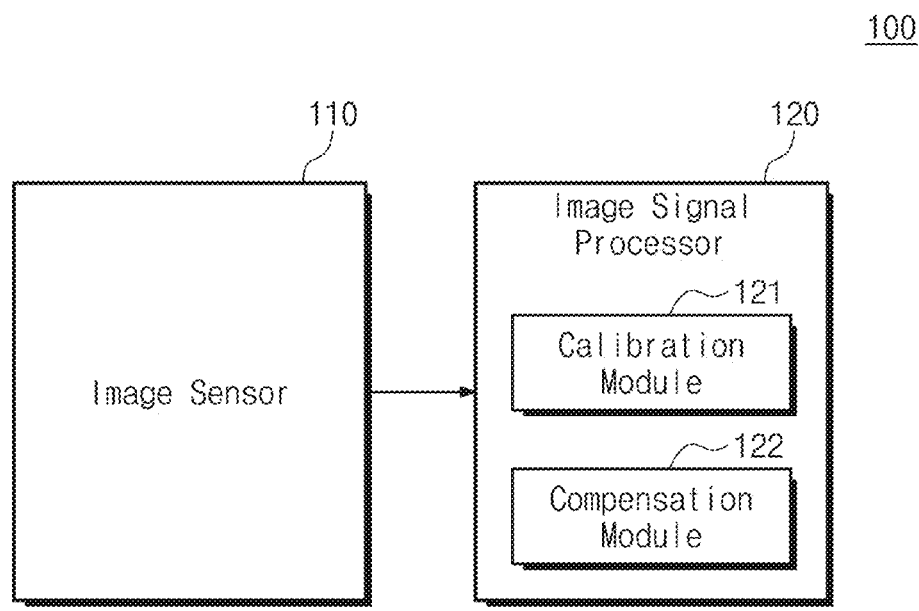
FIG. 1 illustrates a block diagram of an imaging device according to embodiments of the inventive concepts.

FIG. 1 illustrates a block diagram of an imaging device according to embodiments of the inventive concepts. Referring to FIG. 1, an imaging device 100 may include an image sensor 110 and an image signal processor 120. The imaging device 100 may be included in various computing systems such as for example a desktop computer, a laptop computer, a tablet computer, a smartphone, a wearable device, a black box, and a digital camera, or the like.

The image sensor 110 may output image data based on light incident from the outside. For example, the image sensor 110 may include a plurality of pixels. Each of the plurality of pixels may be configured to output an electrical signal corresponding to light incident from the outside. The image sensor 110 may output image data based on the electrical signals. In an embodiment, the image data output from the image sensor 110 may include brightness information and color information of a particular frame.

For example, the image sensor 110 may be implemented with a complementary metal-oxide semiconductor (CMOS) image sensor or the like. For example, the image sensor 110 may be a multi-pixel image sensor having a dual pixel structure or a tetracell structure.

In an embodiment, the image sensor 110 may operate in a first mode or a second mode. The image sensor 110 may operate in the first mode or the second mode under control of a host device (e.g., an application processor (not illustrated)). The first mode indicates a binning mode. The second mode indicates a full mode or a remosaic mode.

For example, binning means an operation that is performed on signals for the purpose of reducing the amount of information included in the signals or the size of data that signals indicate. The binning may include analog binning or digital binning.

The host device may allow the image sensor 110 to operate in the first mode in a low-illuminance environment. The host device may allow the image sensor 110 to operate in the second mode in a high-illuminance environment.

The image signal processor 120 may receive the image data from the image sensor 110 and may perform various signal processing operations on the received image data. In an embodiment, the image signal processor 120 may for example perform the following signal processing on the received image data: noise cancellation, white balancing, gamma correction, color correction, and color transformation. The signal-processed image data may be transferred to an external device (e.g., a display device) or may be stored in a separate storage device.

In an embodiment, the image signal processor 120 may include a calibration module 121 configured to perform a calibration operation and a compensation module 122 configured to perform a compensation operation. As previously described, in some embodiments modules may be circuits and may optionally be driven by firmware and/or software. The calibration module 121 may generate calibration data necessary to perform the compensation operation. For example, the calibration module 121 may generate calibration data at module set-up, in a manufacturing process, or in a mass production process, and may store the calibration data in a memory. The calibration data generated at the beginning and stored in the memory may be used when the compensation operation is repeatedly performed by the compensation module 122.

In an embodiment, the calibration module 121 may periodically update the calibration data. For example, the calibration module 121 may perform the calibration operation periodically depending on a request of a user or under control of an application processor, to generate new calibration data. The compensation module 122 may compensate for a quantization error that occurs while performing a remosaic operation, and may generate a compensated image. For example, the compensation module 122 may load the calibration data from the memory and may perform the compensation operation on an image based on the calibration data. Structures and operation methods of the calibration module 121 and the compensation module 122 according to embodiments of the inventive concepts will be described in greater detail with reference to the following drawings.

Figure 2:
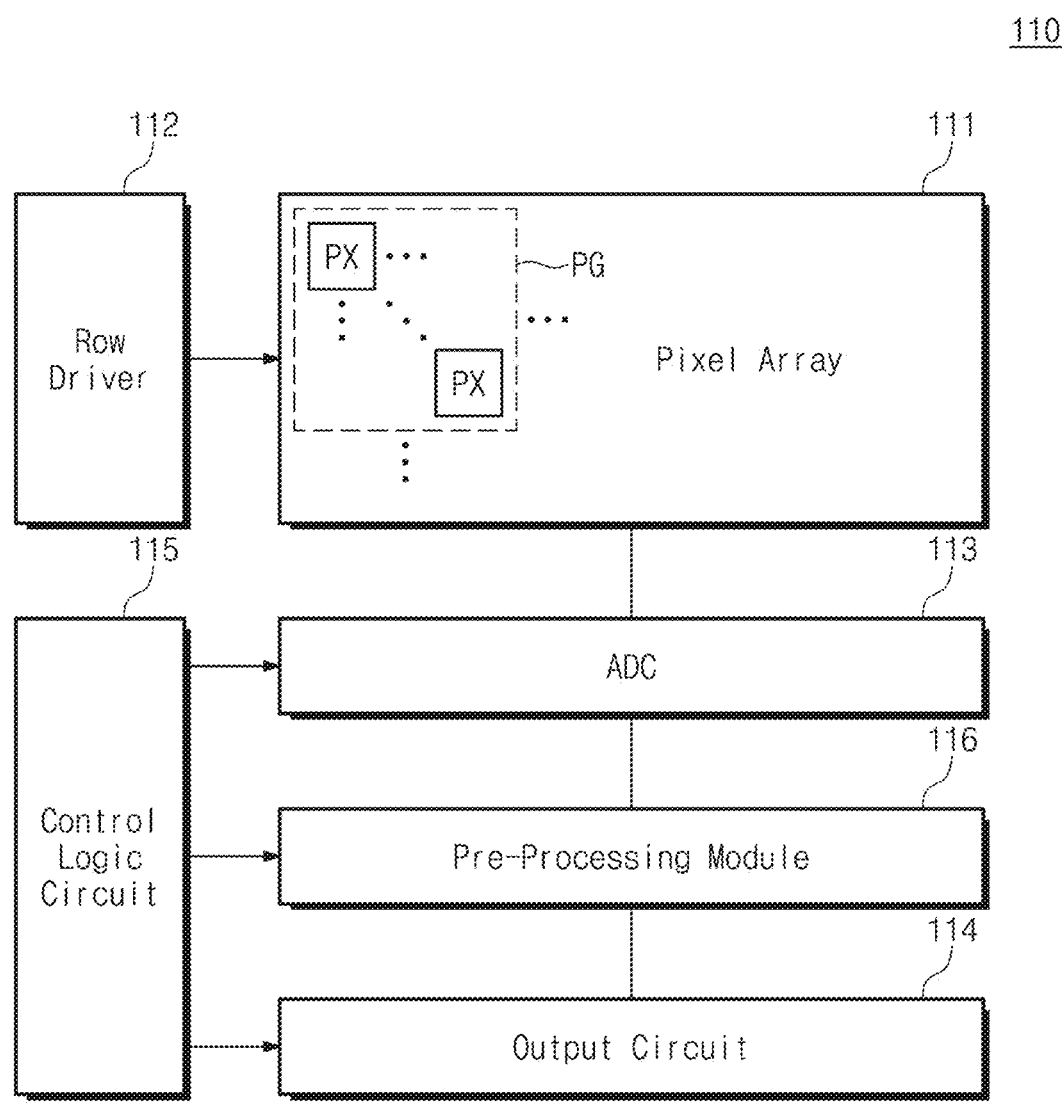
FIG. 2 illustrates a block diagram of an image sensor of FIG. 1.

FIG. 2 illustrates a block diagram of an image sensor of FIG. 1. Referring to FIGS. 1 and 2, the image sensor 110 may include a pixel array 111, a row driver 112, an analog to digital converter (ADC) 113, an output circuit 114, a control logic circuit 115, and a pre-processing module 116.

The pixel array 111 may include a plurality of pixels PX. Each of the plurality of pixels may be configured to output an analog signal, that is an electrical signal proportional to the magnitude of light incident from the outside, based on the incident light. In an embodiment, the plurality of pixels may be combined with different color filters (e.g., R, G, and B color filters) for the purpose of receiving light of different wavelengths.

The plurality of pixels PX of the pixel array 111 may be divided into a plurality of pixel groups PG. Each pixel group PG may include at least two or more pixels. Pixels constituting one pixel group PG may share one floating diffusion region. However, the inventive concepts are not limited thereto, and in other embodiments pixels constituting one pixel group PG may for example share a plurality of floating diffusion regions. In an embodiment, the pixel group PG may include 9 pixels PX arranged in 3 rows and 3 columns, or may include 4 pixels PX arranged in 2 rows and 2 columns. However, the number of pixels constituting the pixel group PG is not limited thereto.

The pixel group PG may include pixels of the same type for the purpose of outputting information about the same color. For example, the pixel group PG may include red pixels "R" converting light of a red spectrum to an electrical signal, green pixels Gr/Gb converting light of a green spectrum to an electrical signal, or blue pixels "B" converting light of a blue spectrum to an electrical signal. To this end, a plurality of color filters may be formed on the pixel group PG, and thus, a multi-color filter array (multi-CFA) may be implemented. The color filter array may be formed based on at least one of various patterns such as a Bayer pattern and a tetra pattern. For example, in a tetra pattern the color filter array may be formed to include filters of the same color placed next to each other in groups of four.

The row driver 112 may be configured to control the plurality of pixels PX included in the pixel array 111. For example, the row driver 112 may generate various control signals (e.g., a shutter signal, a transfer signal, a reset signal, and a selection signal) for controlling the plurality of pixels PX. In an embodiment, the row driver 112 may control the plurality of pixels PX in units of a row, but the inventive concepts are not limited thereto.

The ADC 113 may convert an analog signal from each of the plurality of pixels into a digital signal and may output the digital signal as data. In an embodiment, the ADC 113 may generate data based on correlated double sampling (CDS). Although not illustrated in drawings, the image sensor 110 may further include a storage circuit or a memory configured to store data output from the ADC 113 or a ramp signal generator configured to generate a ramp signal to be used for an operation of the ADC 113.

The pre-processing module 116 may perform signal processing on data or a raw image RAW provided from the ADC 113. For example, the pre-processing module 116 may convert the raw image RAW to data that are available at the following function blocks (e.g., modules included in the image signal processor 120). In an embodiment, the available data may be data having the Bayer pattern.

The pre-processing module 116 may perform signal processing on the raw image RAW under control of the application processor. For example, the pre-processing module 116 may operate in the first mode or the second mode under control of the application processor. In the low-illuminance environment, the pre-processing module 116 may operate in the first mode under control of the application processor. In the high-illuminance environment, the pre-processing module 116 may operate in the second mode under control of the application processor.

In the first mode, the pre-processing module 116 may perform a binning operation such that an image of the Bayer pattern, that is a first image, is generated based on the raw image RAW. For example, the first image indicates an image that is generated by performing the binning operation on the raw image RAW. For example, the first image may be an image having a resolution that is lower than a resolution defined by the number of pixels included in the pixel array 111.

In the second mode, the pre-processing module 116 may perform a remosaic operation such that an image of the Bayer pattern, that is a second image, is generated based on the raw image RAW. For example, the remosaic operation may indicate rearranging orders of pixel data such that data of a tetra pattern are converted into data of the Bayer pattern. The second image indicates an image that is generated by performing the remosaic operation on the raw image RAW. For example, the second image may be an image having a resolution the same as the resolution defined by the number of pixels included in the pixel array 111, that is, a high-resolution image.

The output circuit 114 may transfer the Bayer pattern image output from the pre-processing module 116 to an external device (e.g., a display or a storage device). The Bayer pattern image may include the first image or the second image. The control logic circuit 115 may be configured to control various components in the image sensor 110 under control of an external control device (e.g., an image sensor device controller or an application processor).

Figure 3:
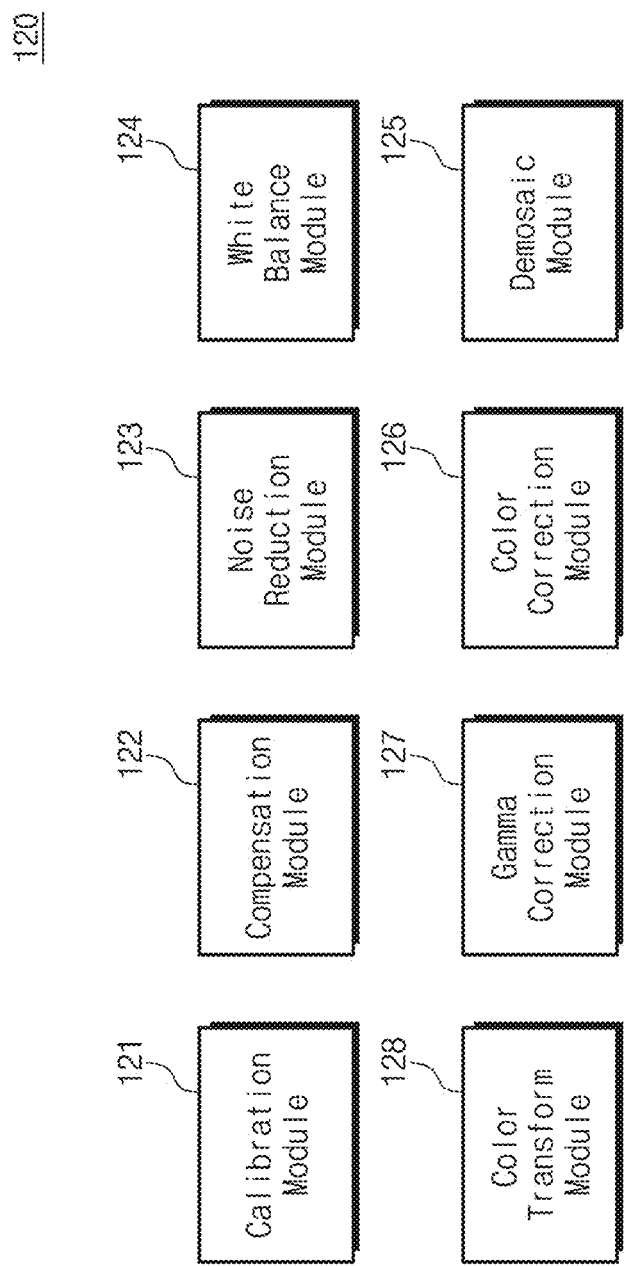
FIG. 3 illustrates a block diagram of an image signal processor of FIG. 1.

FIG. 3 illustrates a block diagram of the image signal processor 120 of FIG. 1. Referring to FIGS. 1 and 3, the image signal processor 120 may include the calibration module 121, the compensation module 122, a noise reduction module 123, a white balance module 124, a demosaic module 125, a color correction module 126, a gamma correction module 127, and a color transform module 128.

The calibration module 121 may generate calibration data necessary for the compensation operation. For example, at module set-up, in a manufacturing process, or in a mass production process, the calibration module 121 may generate calibration data based on a first image associated with a first raw image, and a second image associated with a second raw image. For example, the first and second raw images may be images obtained by capturing or photographing the same scene. The calibration module 121 may generate calibration data by subtracting a plurality of grid data of the second image from a plurality of grid data of the first image. The calibration module 121 may store the generated calibration data in memory.

The compensation module 122 may be configured to perform the compensation operation on the second image provided from the image sensor 110. That is, the compensation module 122 may perform compensation on the second image generated by the image sensor 110 in the second mode. For example, the compensation module 122 may load the calibration data from the memory and may make compensation for a color tone difference with the first mode with respect to the second image based on the calibration data.

In an embodiment, the compensation module 122 may decode the calibration data to generate a calibration image. The compensation module 122 may merge the calibration image and the second image to generate a compensated second image.

The noise reduction module 123 may be configured to reduce a noise of the compensated second image received from the compensation module 122. For example, the noise reduction module 123 may be configured to reduce a fixed-pattern noise or a temporal random noise according to the color filter array CFA of the image sensor 110.

The white balance module 124 may apply white balance to the compensated second image. For example, the white balance module 124 may adjust a white balance gain of the compensated second image and may perform a white balancing operation based on the adjusted white balance gain.

The demosaic module 125 may be configured to transform an output of the white balance module 124 to full-color data. For example, the output of the white balance module 124 may have a data format (e.g., a Bayer format or a tetra format) according to a CFA pattern of the image sensor 110. The demosaic module 125 may be configured to transform the data format according to the CFA pattern of the image sensor 110 to an RGB format.

The color correction module 126 may be configured to correct a color of a high-quality image transformed to the RGB format. The gamma correction module 127 may be configured to correct a gamma value of an output provided from the color correction module 126.

The color transform module 128 may be configured to transform an output of the gamma correction module 127 so as to correspond to a specific format. For example, the output of the gamma correction module 127 may have the RGB format. The color transform module 128 may transform the RGB format to a YUV format.

The image generated from the image signal processor 120 may be provided to an external display device or an external storage device. In an embodiment, the configuration of the image signal processor 120 illustrated in FIG. 3 is an example, and the inventive concepts are not limited thereto. For example, in other embodiments the image signal processor 120 may further include additional components configured to perform any other signal processing operation, as well as the above components.

Figure 4:
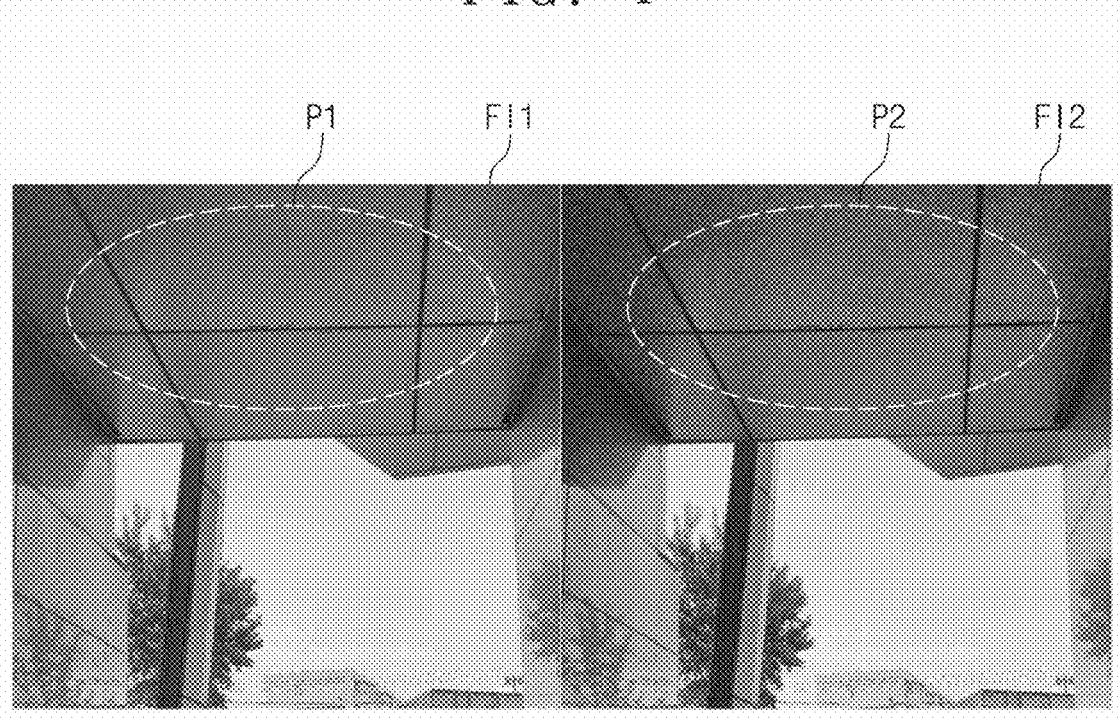
FIG. 4 illustrates images for describing color tone difference of final images generated in a first mode and a second mode.

FIG. 4 illustrates images for describing a color tone difference of final images generated in the first mode and the second mode. Referring to FIGS. 1 to 4, in the first mode, the image sensor 110 may perform analog binning or digital binning every unit pixel group to generate the first image, and the image signal processor 120 may perform various processing (e.g., noise reduction, white balance, and color correction) on the first image and may generate a final image FI1.

In the second mode, the image sensor 110 may perform the remosaic operation to generate the second image. The image signal processor 120 may perform various signal processing on the second image and may generate a second final image FI2.

As illustrated in FIG. 4, color tones of the final image FI1 of the first mode and the second final image FI2 of the second mode may be different. In particular, in the low-illuminance environment, a difference between color tones of the final image FI1 of the first mode and the second final image FI2 of the second mode may increase more. For example, comparing a first portion P1 and a second portion P2 being a low-illuminance area, it may be confirmed that a color tone difference is noticeable unlike the remaining area (i.e., the remaining area other than P1 and P2).

For example, the remosaic operation may include a digital calculation operation of multiplying pixel data and a gain together. A quantization error may be accumulated in this process. The accumulated quantization error may cause a difference between color tones of images as described above. In detail, the pre-processing module 116 may perform rounding down for fast calculation in the digital calculation operation. The pre-processing module 116 may generate remosaic pixel data by multiplying pixel data and a gain together, and rounding down a result of the multiplication to given decimal places. A difference between a value of remosaic pixel data generated through iterative rounding down and a value of binning pixel data generated without rounding down may be great. That is, a color tone difference of the images FI1 and FI2 may increase.

The image signal processor 120 may perform a multiplication operation on various kinds of gains and pixel data. For example, each of the noise reduction module 123, the white balance module 124, the demosaic module 125, the color correction module 126, the gamma correction module 127, and the color transform module 128 may perform a multiplication operation on a gain and pixel data. In particular, in a low-illuminance area, pixel data may be multiplied by a relatively great gain. As such, as a multiplication operation is performed on pixel data and a gain, a noise value of the pixel data may be boosted, and a color tone difference may increase compared to the first mode.

A change in a value of remosaic pixel data may cause a change in an R/G or B/G ratio. The R/G ratio indicates a ratio of red color (R) pixel data and green color (Gr/Gb) pixel data, and the B/G ratio indicates a ratio of blue color (B) pixel data and green color (Gr/Gb) pixel data. For example, after the remosaic operation is performed, in the low-illuminance environment, the R/G or B/G ratio of the second image may change. That is, low code linearity (LCL) being one of items used to evaluate characteristics of an image sensor may be reduced.

Figure 5:
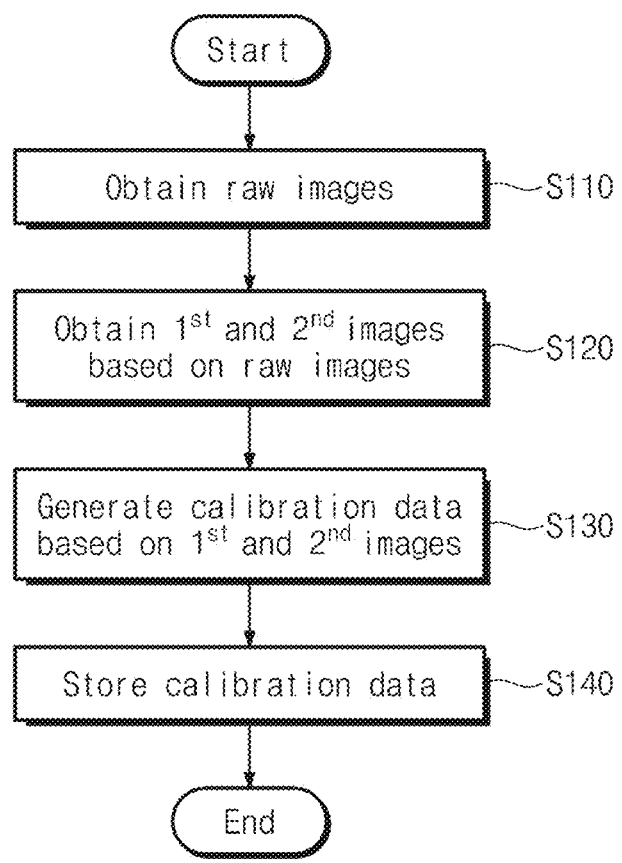
FIG. 5 illustrates a flowchart descriptive of a calibration operation of an image signal processor of FIG. 1.

FIG. 5 illustrates a flowchart descriptive of a calibration operation of an image signal processor of FIG. 1. Referring to FIGS. 1 and 5, the calibration module 121 may perform the calibration operation. For example, the calibration operation may be performed at manufacturing, mass production, or module set-up. In operation S110, the calibration module 121 obtains the raw images RAW. For example, the raw images RAW may have a tetra pattern. The raw images RAW may correspond to information directly sensed from a plurality of pixels. Alternatively, the raw images RAW may correspond to information where a separate pre-processing operation is not performed at the image sensor 110. For example, the raw images RAW may be images all photographed in the low-illuminance environment.

In operation S120, the calibration module 121 obtains a first image generated based on a first raw image RAW and a second image generated based on a second raw image RAW. For example, the first and second raw images RAW may be images generated based on the same scene. The first and second raw images RAW may be images photographed in a black state. The first image indicates an image of the Bayer pattern generated by performing the binning operation on the first raw image RAW. The second image indicates an image of the Bayer pattern generated by performing the remosaic operation on the second raw image RAW.

In operation S130, the calibration module 121 generates calibration data based on the first image and the second image. The calibration data and a structure of the calibration data will be described in greater detail with reference to FIG. 8, and a method for generating calibration data will be described in detail with reference to FIG. 7.

In operation S140, the calibration module 121 stores the generated calibration data in the memory. In an embodiment, the memory may be implemented with an electrically erasable programmable read only memory (EEPROM), but embodiments are not limited thereto. In other embodiments, the calibration data may for example be stored in an electronic fuse (eFUSE), an EEPROM, a mask ROM, a serial PROM, a flash memory, or a one-time programmable (OTP) memory.

In an embodiment, although not illustrated in FIG. 3, the calibration data may be stored in a memory provided within the image signal processor 120. The inventive concepts are not limited thereto, and in other embodiments the calibration data may for example be stored in a memory (e.g., a host memory) provided outside the image signal processor 120 or in a memory provided within the image sensor 110.

Figure 6:
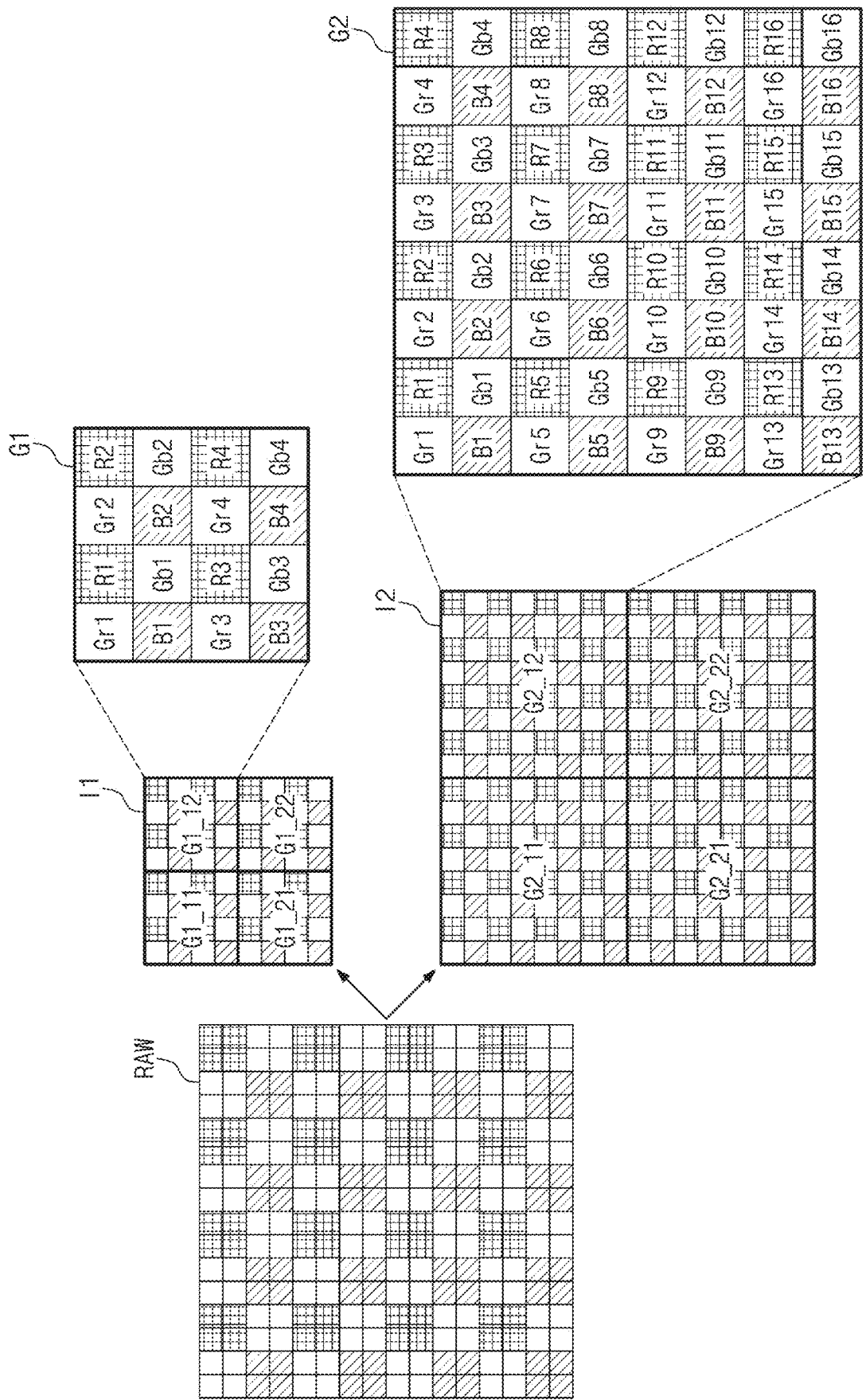
FIG. 6 illustrates a first image, a second image, and a grid.

FIG. 6 illustrates a first image, a second image, and a grid. The raw image RAW illustrated in FIG. 6 may have a tetra pattern. For example, a pixel group PG may include four pixels PX arranged in 2 rows and 2 columns. The inventive concepts are not limited thereto, and in other embodiments the number of pixels included in a pixel group may be variable. The raw image RAW may include 256 pixels arranged in 16 rows and 16 columns. The inventive concepts are not limited thereto, and in other embodiments the number of pixels included in the raw image RAW may be variable. Each pixel may have a digital value or a pixel value (i.e., a code level) as an output of the image sensor 110.

Pixel data may be video data including information about a color of an object. For example, each of 256 pixel data (i.e., video data) may have one of a value "R" associated with a red color, a value Gr or Gb associated with a green color, and a value "B" associated with a blue color.

The pre-processing module 116 of the image sensor 110 may generate a first image I1 or a second image I2 based on the raw image RAW. Because the first image I1 may be generated by performing binning of every pixel group, the size of the first image I1 may be smaller than the size of the raw image RAW. For example, as illustrated in FIG. 6, because the pixel group PG includes 4 pixels, the size of the first image I1 may be ¼ of the size of the raw image RAW. That is, the first image I1 may include 64 pixels arranged in 8 rows and 8 columns.

The pre-processing module 116 may generate the second image I2 of the Bayer pattern based on the raw image RAW of the tetra pattern while maintaining a resolution of the raw image RAW. For example, the size of the second image I2 may be the same as the size of the raw image RAW. That is, the second image I2 may include 256 pixels arranged in 16 rows and 16 columns.

The calibration module 121 and the compensation module 122 may operate based on a grid. Because the sizes of the first image I1 and the second image I2 are different, each of the first image I1 and the second image I2 may be divided into the number of grids. A grid indicates a unit by which the calibration operation and the compensation operation are performed. For example, each of the first image I1 and the second image I2 may be divided into 4 grids. However, the inventive concepts are not limited thereto, and in other embodiments the size of a grid and the number of grids may be changed.

The first image I1 may be divided into a plurality of first grids G1_11, G1_12, G1_21, and G1_22. The first grid G1 may include 16 pixel data arranged in 4 rows and 4 columns, and each pixel data may have a digital value. The first grid G1 may have the Bayer pattern. For example, in the first grid G1, a first green color Gr1 may be located at the first row and the first column, a first red color R1 may be located at the first row and the second column, a first blue color B1 may be located at the second row and the first column, and a first green color Gb1 may be located at the second row and the second column. As in the above description, positions for respective colors may be determined by the remaining rows and the remaining columns. Additional description associated with the positions for respective colors will be omitted.

The second image I2 may be divided into a plurality of second grids G2_11, G2_12, G2_21, and G2_22. The second grid G2 may include 64 pixel data arranged in 8 rows and 8 columns, and each pixel data may have a digital value. The second grid G2 may have the Bayer pattern. For example, in the second grid G2, a first green color Gr1 may be located at the first row and the first column, a first red color R1 may be located at the first row and the second column, a first blue color B1 may be located at the second row and the first column, and a first green color Gb1 may be located at the second row and the second column. As in the above description, positions for respective colors may be determined by the remaining rows and the remaining columns. Additional description associated with the positions for respective colors will be omitted.

In an embodiment, the first grid G1 and the second grid G2 may correspond to each other. For example, the first grid G1_11 may correspond to the second grid G2_11, the first grid G1_12 may correspond to the second grid G2_12, the first grid G1_21 may correspond to the second grid G2_21, and the first grid G1_22 may correspond to the second grid G2_22.

Figure 7:
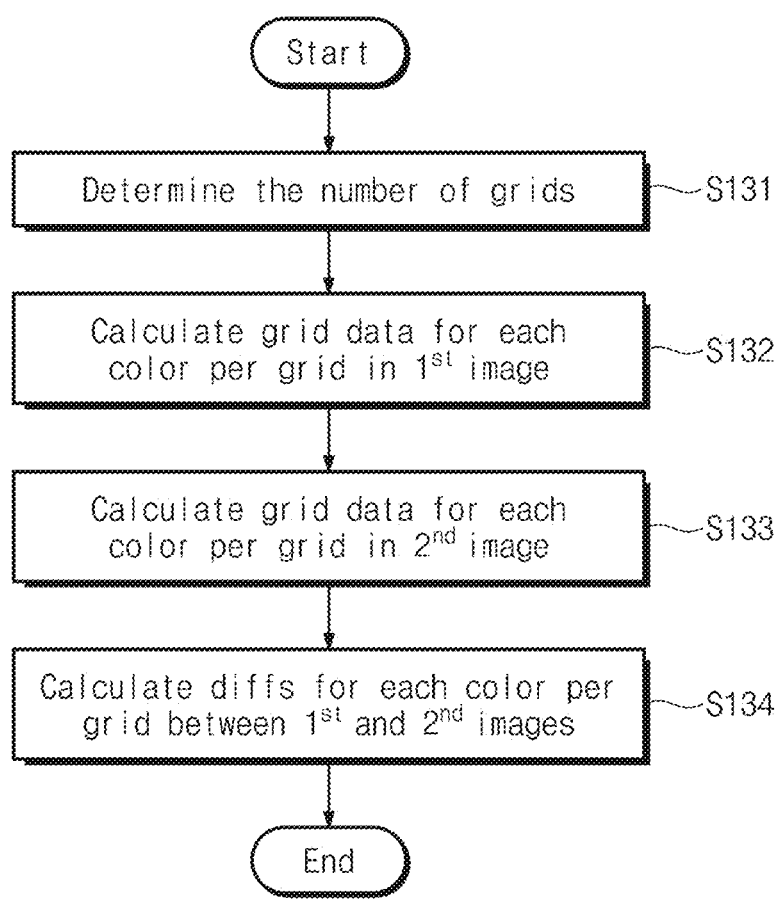
FIG. 7 illustrates a flowchart descriptive of operation S130 of FIG. 5 in greater detail.
Figure 8:
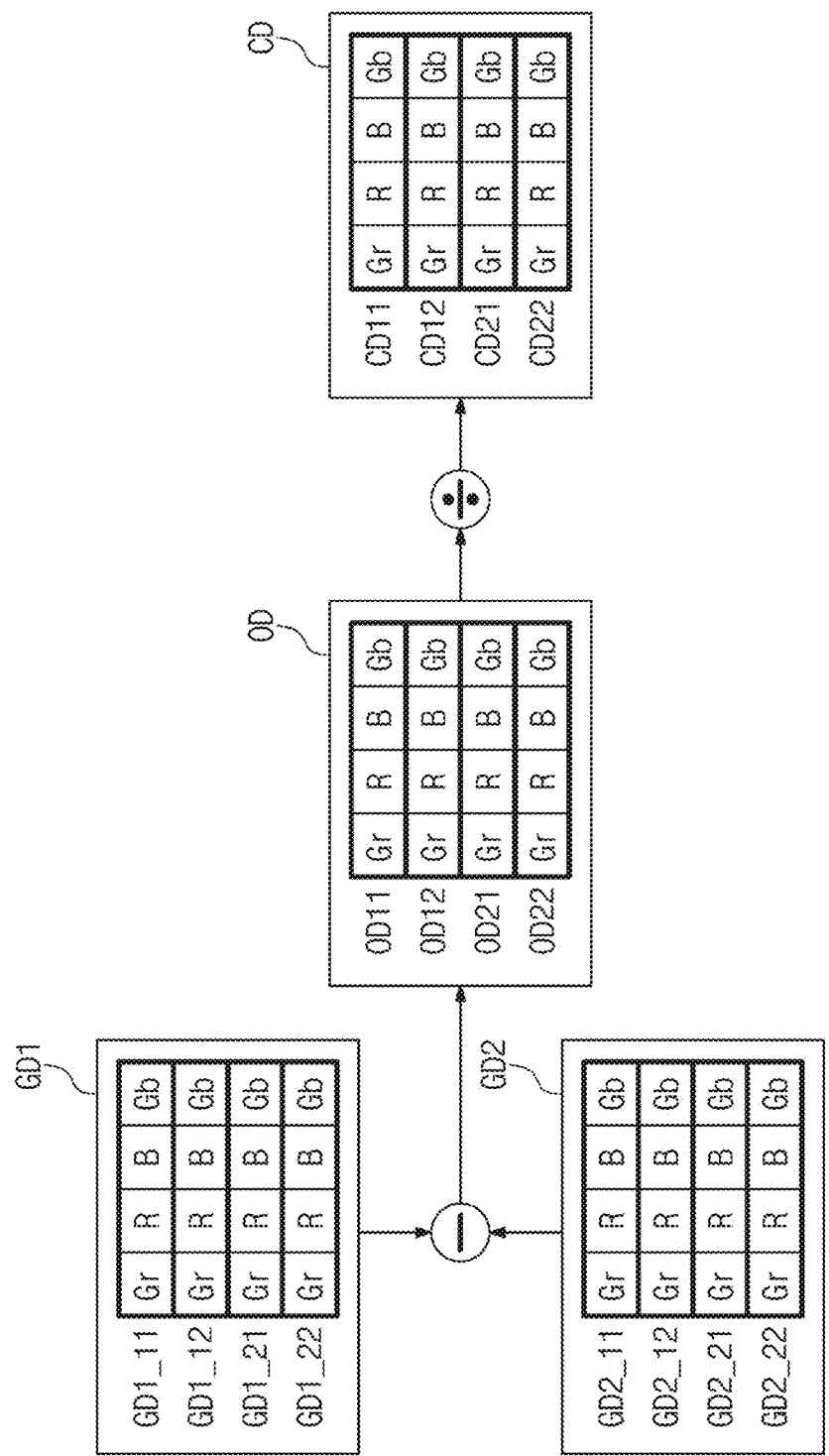
FIG. 8 illustrates a diagram descriptive of a method for generating calibration data.

FIG. 7 illustrates a flowchart descriptive of operation S130 of FIG. 5 in greater detail. FIG. 8 illustrates a diagram descriptive of a method for generating calibration data. A calibration operation will be described with reference to FIGS. 1, 6, 7, and 8. In operation S131, the calibration module 121 may determine the number of grids. For example, the calibration module 121 determines the number of grids included in each of the first image and the second image. The size of a grid may for example be determined depending on a resolution, the size of a memory, a calculation speed, etc. The size of a grid may be determined in advance. For example, as the size of a grid becomes smaller, the size of calibration data may increase, but the compensation operation may be performed more accurately.

In operation S132, the calibration module 121 calculates grid data or an average value associated with each color, for each grid of the first image. For example, the calibration module 121 may generate first grid data GD1_11 to GD1_22 respectively corresponding to the plurality of first grids G1_11 to G1_22.

Grid data may include green color (Gr) grid data, red color (R) grid data, blue color (B) grid data, and green color (Gb) grid data. Grid data for each color may be a representative value among values of corresponding color pixels included in a grid. For example, the representative value may be an average value. Green color (Gr) grid data may be an average value of green color (Gr) pixels included in a grid. Red color (R) grid data may be an average value of red color (R) pixels included in the grid. Blue color (B) grid data may be an average value of blue color (B) pixels included in the grid. Green color (Gb) grid data may be an average value of green color (Gb) pixels included in the grid.

Each of the first grid data GD1_11 to GD1_22 may include first green color (Gr) grid data, first red color (R) grid data, first blue color (B) grid data, and first green color (Gb) grid data. For example, the first grid data GD1_11 may include first green color (Gr) grid data GD1_11_Gr, first red color (R) grid data GD1_11_R, first blue color (B) grid data GD1_11_B, and first green color (Gb) grid data GD1_11_Gb.

For example, the calibration module 121 may calculate the first grid data GD1_11 associated with each color of the grid G1_11. The first green grid data GD1_11_Gr may be an average pixel value of green color (Gr) pixel positions G1_Gr1, G1_Gr2, G1_Gr3, and G1_Gr4. The first red grid data GD1_11_R may be an average pixel value of red color (R) pixel positions G1_R1, G1_R2, G1_R3, and G1_R4. The first blue grid data GD1_11_B may be an average pixel value of blue color (B) pixel positions G1_B1, G1_B2, G1_B3, and G1_B4. The first green grid data GD1_11_Gb may be an average pixel value of green color (Gb) pixel positions G1_Gb1, G1_Gb2, G1_Gb3, and G1_Gb4. As in the above manner, the calibration module 121 may calculate the first grid data GD1_12 to GD1_22 of the remaining grids G1_12 to G1_22.

In operation S133, the calibration module 121 calculates grid data or an average value associated with each color, for each grid of the second image. For example, the calibration module 121 may generate second grid data GD2_11 to GD2_22 respectively corresponding to the plurality of second grids G2_11 to G2_22.

Each of the second grid data GD2_11 to GD2_22 may include second green color (Gr) grid data, second red color (R) grid data, second blue color (B) grid data, and second green color (Gb) grid data. For example, the second grid data GD2_11 may include second green color (Gr) grid data GD2_11_Gr, second red color (R) grid data GD2_11_R, second blue color (B) grid data GD2_11_B, and second green color (Gb) grid data GD2_11_Gb.

In the second grid data, a grid data value of each color may indicate an average value of pixel values associated with each color included in a grid. The second grid data are similar to the first grid data, and thus, additional description will be omitted to avoid redundancy.

For example, the calibration module 121 may calculate the second grid data GD2_11 associated with each color of the grid G2_11. The second green grid data GD2_11_Gr may be an average pixel value of green color (Gr) pixel positions G2_Gr1 to G2_Gr16. The second red grid data GD2_11_R may be an average pixel value of red color (R) pixel positions G2_R1 to G2_R16. The second blue grid data GD2_11_B may be an average pixel value of blue color (B) pixel positions G2_B1 to G2_B16. The second green grid data GD2_11_Gb may be an average pixel value of green color (Gb) pixel positions G2_Gb1 to G2_Gb16. As in the above manner, the calibration module 121 may calculate the second grid data GD2_12 to GD2_22 of the remaining grids G2_12 to G2_22.

In operation S134, the calibration module 121 calculates a grid data difference or an offset between the first image and the second image, which is associated with each color, for each grid. For example, the calibration module 121 may generate offset data for each color of a grid, based on the first grid data GD1 generated in operation S132 and the second grid data GD2 generated in operation S133. That is, the calibration module 121 may generate offset data OD11 to OD22 (i.e., OD) corresponding to the first and second grids G1_11 to G1_22 and G2_11 to G2_22. For example, the offset data OD11 may correspond to the first and second grid data GD1_11 and GD2_11, the offset data OD12 may correspond to the first and second grid data GD1_12 and GD2_12, the offset data OD21 may correspond to the first and second grid data GD1_21 and GD2_21, and the offset data OD22 may correspond to the first and second grid data GD1_22 and GD2_22.

Each of the offset data OD11 to OD22 may include green color (Gr) offset data, red color (R) offset data, blue color (B) offset data, and green color (Gb) offset data. For example, the calibration module 121 may calculate offset data OD11 associated with each color. The calibration module 121 may generate offset data OD based on the first grid data GD1 and the second grid data GD2. For example, the calibration module 121 may subtract the second grid data GD2 from the first grid data GD1 to generate the offset data OD.

Green offset data OD11_Gr may be generated by subtracting the second green grid data GD2_11_Gr from the first green grid data GD1_11_Gr. Red offset data OD11_R may be generated by subtracting the second red grid data GD2_11_R from the first red grid data GD1_11_R. Blue offset data OD11_B may be generated by subtracting the second blue grid data GD2_11_B from the first blue grid data GD1_11_B. Green offset data OD11_Gb may be generated by subtracting the second green grid data GD2_11_Gb from the first green grid data GD1_11_Gb. As in the above manner, the remaining offset data OD12 to OD22 may be calculated, and thus, additional description will be omitted to avoid redundancy.

In an embodiment, the calibration module 121 may divide the offset data OD by a given value to generate calibration data CD11 to CD22 (i.e., CD). That is, the calibration module 121 may generate the calibration data CD11 to CD22 respectively corresponding to the first and second grids G1_11 to G1_22 and G2_11 to G2_22.

Each of the calibration data CD11 to CD22 may include green color (Gr) calibration data, red color (R) calibration data, blue color (B) calibration data, and green color (Gb) calibration data. For example, the calibration data CD11 may include green color (Gr) calibration data CD11_Gr, red color (R) calibration data CD11_R, blue color (B) calibration data CD11_B, and green color (Gb) calibration data CD11_Gb.

In an embodiment, the given value may be the reciprocal of the number of pixels of the second grid G2, which have the same color. Because the number of pixels for each color of the second grid G2 is 16, the given value may be ¹⁄₁₆. That is, because the number of red color (R) pixels included in the second grid G2 is 16, the number of blue color (B) pixels included in the second grid G2 is 16, the number of green color (Gr) pixels included in the second grid G2 is 16, and the number of green color (Gb) pixels included in the second grid G2 is 16, the given value may be ¹⁄₁₆.

For example, the green calibration data CD11_Gr may correspond to a value obtained by dividing the green offset data OD11_Gr by 16, the red calibration data CD11_R may correspond to a value obtained by dividing the red offset data OD11_R by 16, the blue calibration data CD11_B may correspond to a value obtained by dividing the blue offset data OD11_B by 16, and the green calibration data CD11_Gb may correspond to a value obtained by dividing the green offset data OD11_Gb by 16.

Figure 9:
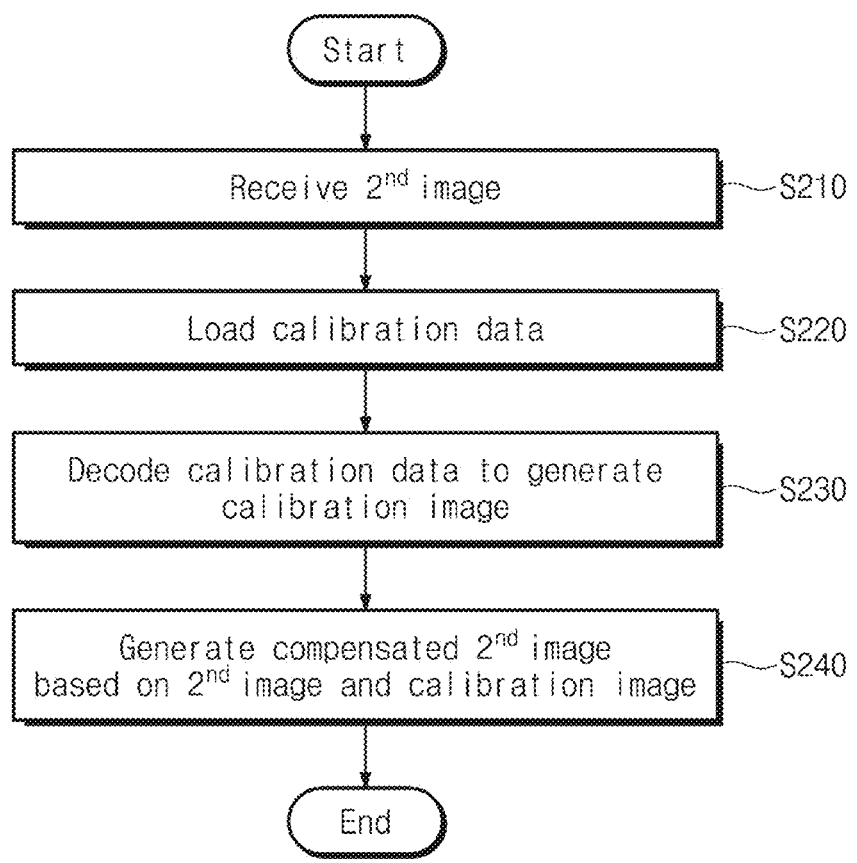
FIG. 9 illustrates a flowchart descriptive of a compensation operation of a compensation module of FIG. 1.

FIG. 9 illustrates a flowchart descriptive of a compensation operation of a compensation module of FIG. 1. Referring to FIGS. 1 and 9, in operation S210, the compensation module 122 receives the second image I2. For example, the second image I2 indicates an image generated through the remosaic operation of the pre-processing module 116 in the second mode.

In operation S220, the compensation module 122 loads the calibration data CD. For example, the compensation module 122 may load the calibration data CD from the memory. The calibration data CD are described above, and thus, additional description will be omitted to avoid redundancy.

In operation S230, the compensation module 122 decodes the calibration data CD for the purpose of generating a calibration image. The compensation module 122 may generate a calibration image CI based on the calibration data CD. The calibration image CI and a structure of the calibration image CI will be described in more detail with reference to FIGS. 10 and 12.

In operation S240, the compensation module 122 generates compensated second image CI2 based on the calibration image CI. For example, the compensation module 122 may sum the calibration image CI and the second image I2 to generate the compensated second image CI2. This will be described in greater detail with reference to FIG. 13.

Figure 10:
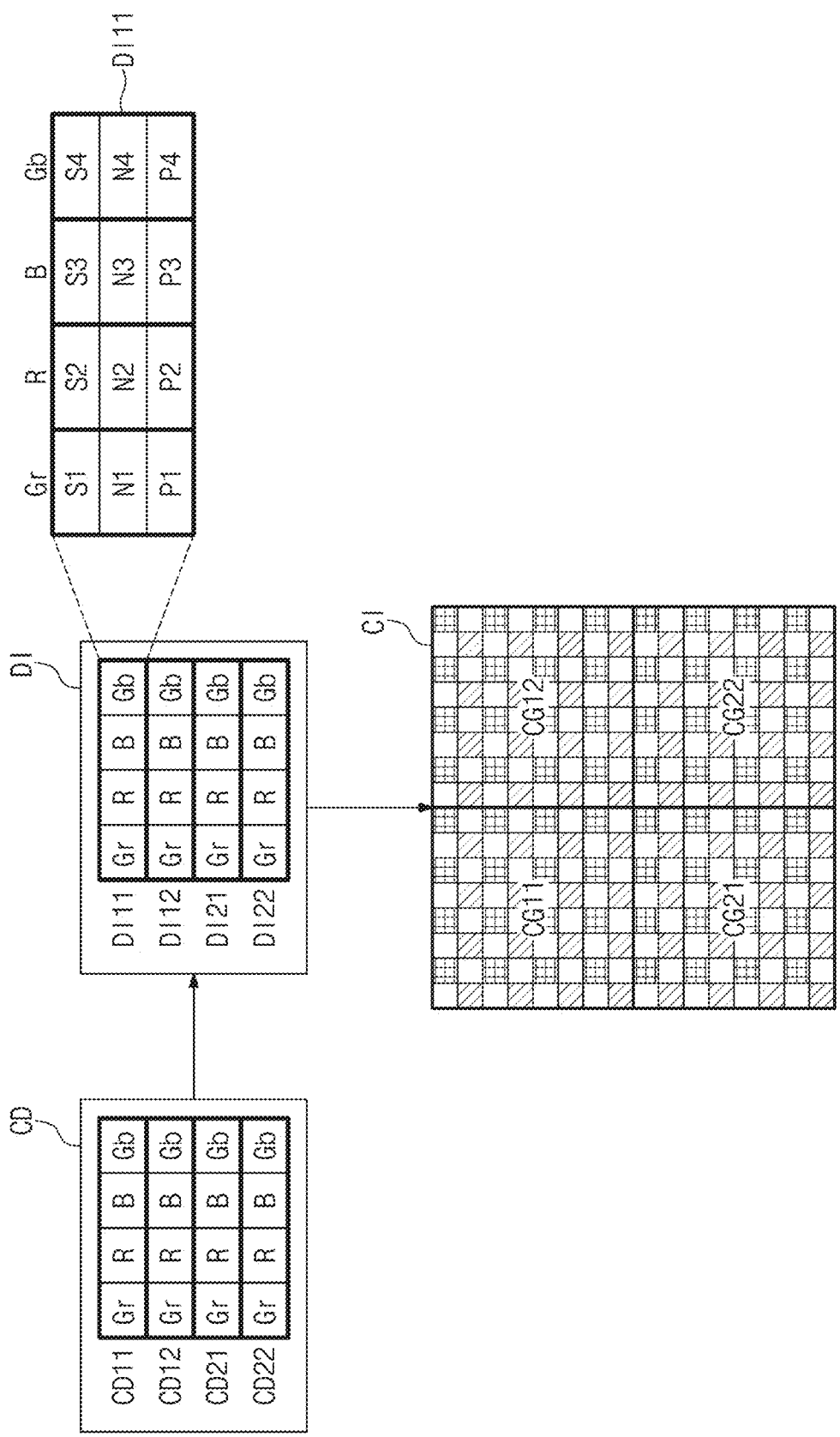
FIG. 10 illustrates a diagram of decoding information and a calibration image.
Figure 11:
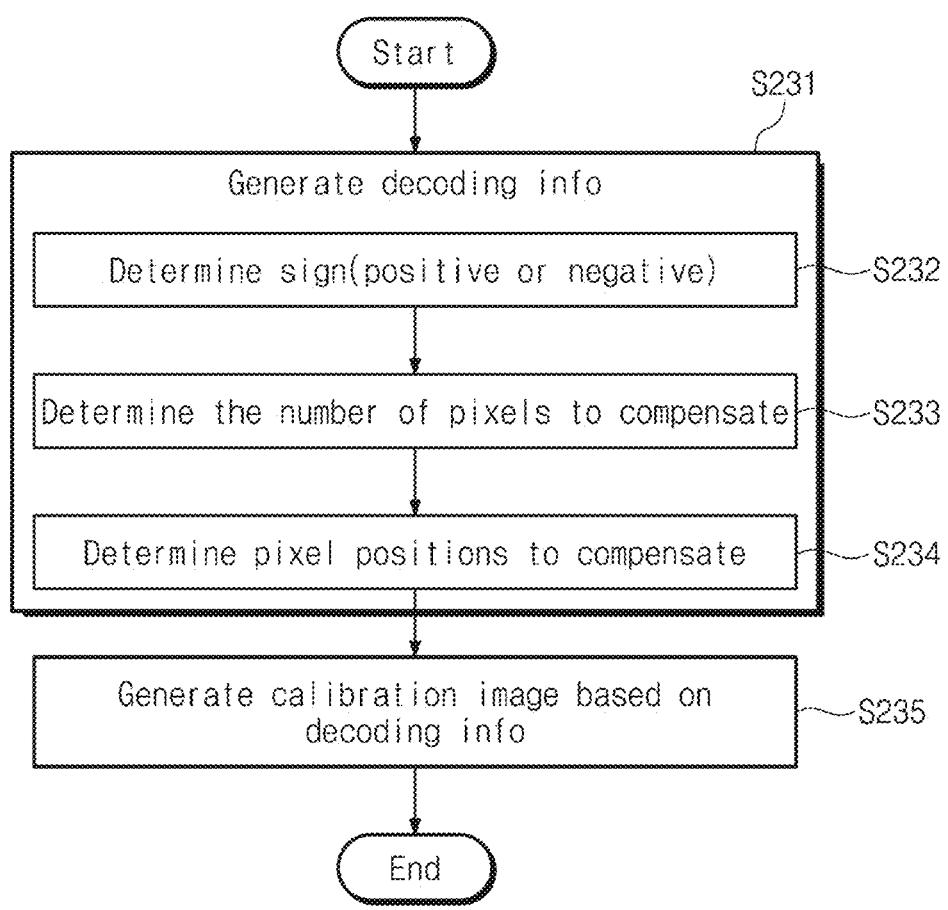
FIG. 11 illustrates a flowchart descriptive of operation S230 of FIG. 9 in greater detail.

FIG. 10 illustrates a diagram of decoding information and calibration image. FIG. 11 illustrates a flowchart descriptive of operation S230 of FIG. 9 in greater detail. Referring to FIGS. 10 and 11, the compensation module 122 may generate the calibration image CI based on the calibration data CD. The calibration image CI may be an image to which the calibration data CD are applied.

In an embodiment, the size of the calibration image CI may be the same as the size of the second image I2. That is, the calibration image CI may include 256 pixels arranged in 16 rows and 16 columns. The calibration image CI may be divided into a plurality of calibration grids CG11, CG12, CG21, and CG22. The size of the calibration grid CG may be the same as the size of the second grid G2. Pixel values may have calibration values, respectively. That is, a pixel value included in the calibration grid CG may indicate a calibration value. Calibration values may be determined based on calibration data.

In operation S231, the compensation module 122 generates decoding information DI11 to DI22 (i.e., DI) based on the calibration data CD. In an embodiment, the compensation module 122 may generate the decoding information DI11 to DI22 respectively corresponding to the calibration data CD11 to CD22.

In an embodiment, each of the decoding information DI11 to DI22 may include green color (Gr) decoding information, red color (R) decoding information, blue color (B) decoding information, and green color (Gb) decoding information. For example, the decoding information DM may include green color (Gr) decoding information DI11_Gr, red color (R) decoding information DI11_R, blue color (B) decoding information DI11_B, and green color (Gb) decoding information DI11_Gb.

In an embodiment, each of the decoding information DI11_Gr, DI11_R, DI11_B, and DI11_Gb may include sign information "S", number information "N", and position information "P" for each color. For example, the sign information "S" indicates a sign of a calibration value or a compensation sign. For example, a sign of a calibration value may be one of (+) or (−). That is, a sign of a calibration value may be one of positive or negative. The number information "N" indicates the number of pixels targeted for compensation. For example, the number information "N" indicates the number of pixels having a calibration value which is not "0", from among corresponding color pixels in the calibration grid CG. The position information "P" indicates positions of pixels targeted for compensation. For example, the position information "P" indicates positions of pixels having a calibration value which is not "0", from among corresponding color pixels in the calibration grid CG.

For example, in the decoding information DI11, green sign information S1 may indicate a sign of a calibration value that green color (Gr) pixels of the calibration grid CG11 may have. Red sign information S2 may indicate a sign of a calibration value that red color (R) pixels of the calibration grid CG11 may have. Blue sign information S3 may indicate a sign of a calibration value that blue color (B) pixels of the calibration grid CG11 may have. Green sign information S4 may indicate a sign of a calibration value that green color (Gb) pixels of the calibration grid CG11 may have.

For example, green number information N1 may indicate the number of green color (Gr) pixels, a calibration value of which is not "0", from among green color (Gr) pixels of the calibration grid CG11. Red number information N2 may indicate the number of red color (R) pixels, a calibration value of which is not "0", from among red color (R) pixels of the calibration grid CG11. Blue number information N3 may indicate the number of blue color (B) pixels, a calibration value of which is not "0", from among blue color (B) pixels of the calibration grid CG11. Green number information N4 may indicate the number of green color (Gb) pixels, a calibration value of which is not "0", from among green color (Gb) pixels of the calibration grid CG11.

For example, green position information P1 may indicate positions of green color (Gr) pixels, a calibration value of which is not "0", from among green color (Gr) pixels of the calibration grid CG11. Red position information P2 may indicate positions of red color (R) pixels, a calibration value of which is not "0", from among red color (R) pixels of the calibration grid CG11. Blue position information P3 may indicate positions of blue color (B) pixels, a calibration value of which is not "0", from among blue color (B) pixels of the calibration grid CG11. Green position information P4 may indicate positions of green color (Gb) pixels, a calibration value of which is not "0", from among green color (Gb) pixels of the calibration grid CG11.

As in the above description, each of the remaining decoding information DI12 to DI22 may include green color (Gr) decoding information, red color (R) decoding information, blue color (B) decoding information, and green color (Gb) decoding information. Also, each of the decoding information DI12 to DI22 may include sign information "S", number information "N", and position information "P" for each color. This is described above, and thus, additional description will be omitted to avoid redundancy.

In operation S232, the compensation module 122 determines a compensation sign. The compensation module 122 may generate the sign information "S". As described above, a compensation sign may be one of positive or negative. The compensation sign may be determined based on the calibration data CD. For example, the compensation module 122 may divide calibration data by an absolute value of the calibration data to generate a compensation sign.

In operation S233, the compensation module 122 determines the number of pixels targeted for compensation. That is, the compensation module 122 may generate the number information "N". The compensation module 122 may calculate the number of pixels targeted for compensation, based on the calibration data. For example, the number of pixels targeted for compensation may correspond to an absolute value of the calibration data.

In operation S234, the compensation module 122 determines a position of a pixel targeted for compensation. That is, the compensation module 122 may generate the position information "P". The compensation module 122 may select a pixel position (hereinafter referred to as a "compensation pixel position") where a compensation operation is to be performed, based on the number of pixels targeted for compensation. The compensation module 122 may randomly determine a position of a pixel, on which a compensation operation is to be performed, from among a plurality of pixels in a grid, in various schemes.

In an embodiment, the compensation module 122 may determine a compensation pixel position by using a hash function. The compensation module 122 may randomly determine a compensation pixel position by using a seed. By randomly selecting a compensation pixel position, the occurrence of a pattern-type noise or an artifact may be prevented in units of grid.

The compensation module 122 may decode the calibration data CD to generate the decoding information DI11 to DI22. For example, the compensation module 122 may perform operation S232 to operation S234 for the purpose of generating green decoding information DI11_Gr, may perform operation S232 to operation S234 for the purpose of generating red decoding information DI11_R, may perform operation S232 to operation S234 for the purpose of generating blue decoding information DI11_B, and may perform operation S232 to operation S234 for the purpose of generating green decoding information DI11_Gb. As in the above description, the compensation module 122 may generate the remaining decoding information DI12 to DI22. However, the inventive concepts are not limited thereto, and in other embodiments an order of the above operations may be changed, or the above operations may be simultaneously performed.

In operation S235, the compensation module 122 generates the calibration image CI based on the decoding information DI. In an embodiment, 256 pixels included in the calibration image CI may be initialized to a default value. For example, the default value may be "0". The compensation module 122 may generate the calibration grid CG11 based on the decoding information DM, may generate the calibration grid CG12 based on the decoding information DI12, may generate the calibration grid CG21 based on the decoding information DI21, and may generate the calibration grid CG22 based on the decoding information DI22. A method for generating a calibration grid and a calibration image will be described in greater detail with reference to FIG. 12.

Figure 12:
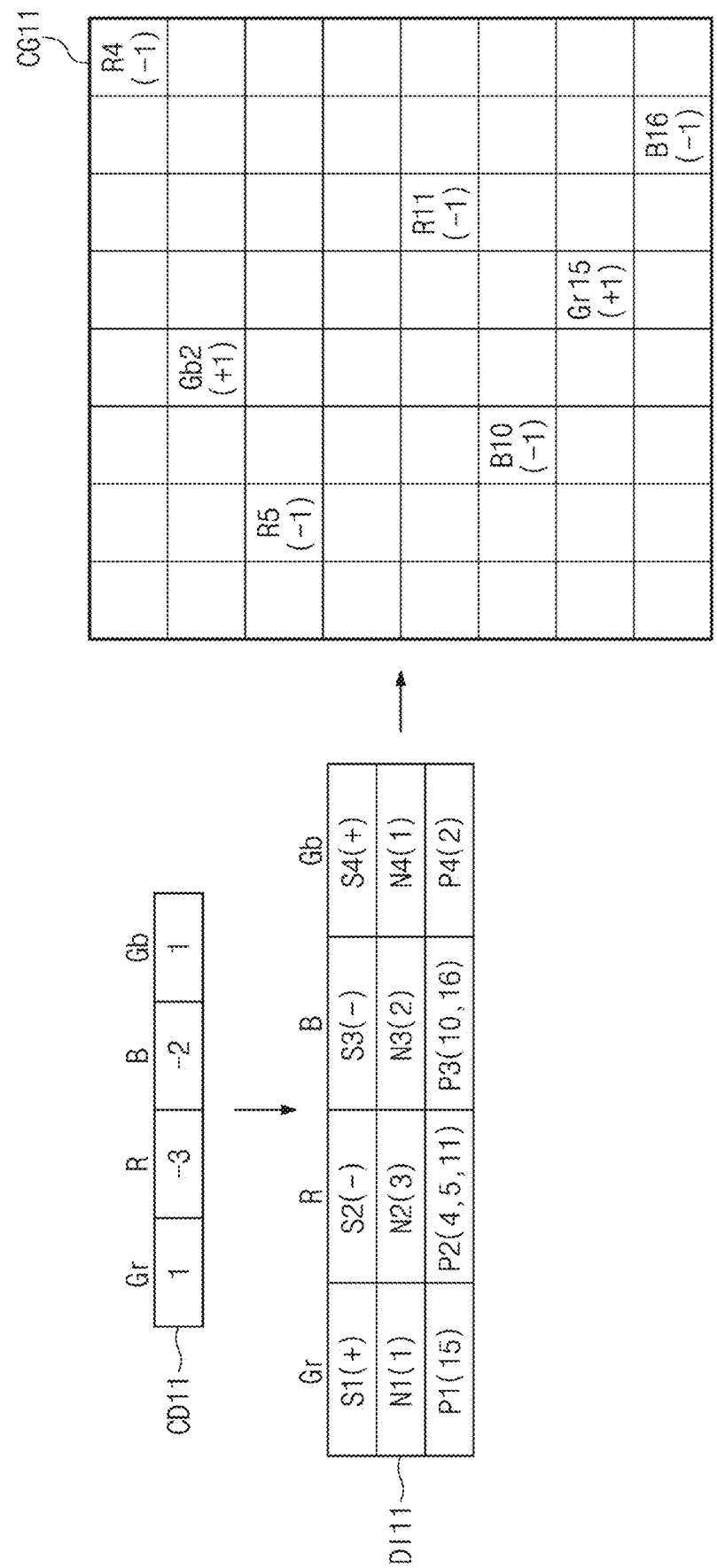
FIG. 12 illustrates a diagram descriptive of a method for generating a calibration grid.

FIG. 12 illustrates a diagram descriptive of a method for generating a calibration grid. Referring to FIGS. 1, 10, 11, and 12, it is assumed that the green calibration data CD11_Gr is "1", the red calibration data CD11_R is "−3", the blue calibration data CD11_Gr is "−2", and the green calibration data CD11_Gb is "1". Each calibration data is an example, and the inventive concepts are not limited thereto.

The compensation module 122 may perform a decoding operation based on the calibration data CD. That is, the compensation module 122 may generate the corresponding decoding information DI11 based on the calibration data CD11.

For example, the compensation module 122 may determine a compensation sign. That is, the compensation module 122 may generate sign information. The compensation module 122 may divide calibration data by an absolute value of the calibration data to generate a compensation sign. Because the green calibration data CD11_Gr is "1", green sign information S1 may correspond to "positive". Because the red calibration data CD11_R is "−3", red sign information S2 may correspond to "negative". Because the blue calibration data CD11_B is "−2", blue sign information S3 may correspond to "negative". Because the green calibration data CD11_Gb is "1", green sign information S4 may correspond to "positive".

The compensation module 122 may determine the number of pixels targeted for compensation. That is, the compensation module 122 may generate number information. The number information may correspond to an absolute value of the calibration data. For example, because the green calibration data CD11_Gr is "1", green number information N1 may correspond to "1". Because the red calibration data CD11_R is "−3", red number information N2 may correspond to "3". Because the blue calibration data CD11_B is "−2", blue number information N3 may correspond to "2". Because the green calibration data CD11_Gb is "1", green number information N4 may correspond to "1".

The compensation module 122 may determine positions of pixels targeted for compensation. That is, the compensation module 122 may generate position information. The compensation module 122 may randomly select compensation pixel positions corresponding to the number information. For example, because the green calibration data CD11_Gr is "1", green position information P1 may be "15". For example, "15" indicates Gr15. The calibration grid CG11 may include green pixel positions Gr1 to Gr16. Because the green number information N1 is "1", the compensation module 122 may randomly select one position Gr15 from the green pixel positions Gr1 to Gr16.

Because the red calibration data CD11_R is "−3", red position information P2 may include 4, 5, and 11. The calibration grid CG11 may include red pixel positions R1 to R16. Because the red number information N2 is "3", the compensation module 122 may randomly select three positions R4, R5, and R11 from the red pixel positions R1 to R16.

Because the blue calibration data CD11_B is "−2", blue position information P3 may include 10 and 16. The calibration grid CG11 may include blue pixel positions B1 to B16. Because the blue number information N3 is "2", the compensation module 122 may randomly select two positions B10 and B16 from the blue pixel positions B1 to B16.

Because the green calibration data CD11_Gb is "1", green position information P4 may include 2. The calibration grid CG11 may include green pixel positions Gb1 to Gb16. Because the green number information N4 is "1", the compensation module 122 may randomly select one position Gb2 from the green pixel positions Gb1 to Gb16. Selection of compensation pixel positions are here disclosed by way of example, and the inventive concepts are not limited thereto.

The compensation module 122 may generate the calibration image CI based on the decoding information DI. For example, pixels included in the calibration image CI or pixels included in each of the calibration grids CG11 to CG22 may be initialized to "0". The compensation module 122 may generate a calibration grid CG11 based on the decoding information DI11.

In the decoding information DI11, because the green sign information S1 is (+), the green number information N1 is "1", and the green position information P1 is "15", the compensation module 122 may set a pixel value or a calibration value of the calibration grid CG11, which corresponds to a pixel position Gr15, to "1". Because the red sign information S2 is (−), the red number information N2 is "3", and the red position information P2 is 4, 5, and 11, the compensation module 122 may set pixel values of the calibration grid CG11, which respectively correspond to pixel positions R4, R5, and R11, to "−1".

Because the blue sign information S3 is (−), the blue number information N3 is "2", and the blue position information P3 is 10 and 16, the compensation module 122 may set pixel values of the calibration grid CG11, which respectively correspond to pixel positions B10 and B16, to "−1". Because the green sign information S4 is (+), the green number information N4 is "1", and the green position information P4 is "2", the compensation module 122 may set a pixel value of the calibration grid CG11, which corresponds to a pixel position Gb2, to "1".

As in the above description, calibration grids CG12 to CG22 respectively corresponding to the decoding information DI12 to DI22 may be generated. That is, the compensation module 122 may decode calibration data to generate decoding information and may generate a calibration image based on the decoding information.

Figure 13:
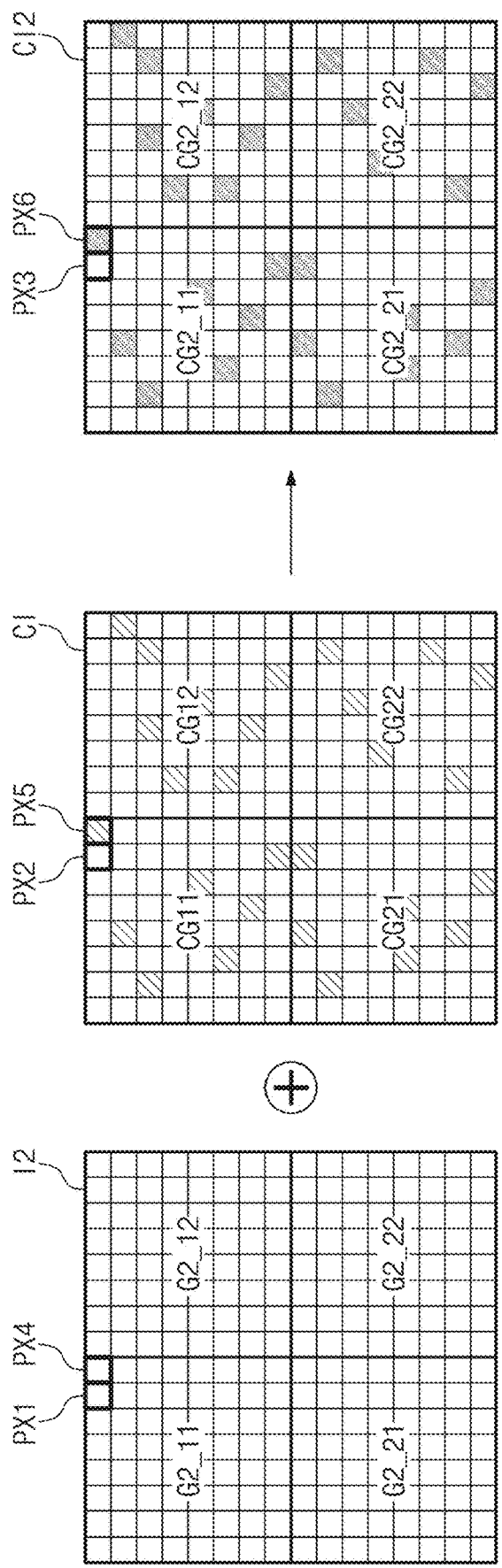
FIG. 13 illustrates a diagram descriptive of operation S240 of FIG. 9.

FIG. 13 illustrates a diagram descriptive of operation S240 of FIG. 9. Referring to FIGS. 1 and 13, the compensation module 122 may generate the compensated second image CI2 based on the second image I2 and the calibration image CI. For example, the compensation module 122 may sum the calibration image CI and the second image I2 to generate the compensated second image CI2. In the calibration image CI, a cross-hatched pixel indicates a pixel having a pixel value (or a calibration value) which is not "0". In the compensated second image CI2, a shaded pixel indicates a pixel having a pixel value which is different from that of the second image I2, that is, a compensated pixel. The compensated second image CI2 may be divided into a plurality of compensated second grids CG2_11 to CG2_22. The compensated second grids CG2_11 to CG2_22 may correspond to the second grids G2_11 to G2_22 or the calibration grids CG11 to CG22, respectively.

For example, the compensation module 122 may sum a pixel value of the second image I2 and a corresponding pixel value of the calibration image CI to generate a corresponding pixel value of the compensated second image CI2. That is, a value of a pixel at the first row and first column of the compensated second image CI2 may be generated by summing a value of a pixel at the first row and first column of the second image I2 and a value of a pixel at the first row and first column of the calibration image CI.

A pixel value of the compensated second image CI2 corresponding to a pixel of the calibration image CI which has a calibration value of "0", may be the same as a corresponding pixel value of the second image I2. That is, the compensation module 122 may sum a value of a first pixel PX1 and a value of a second pixel PX2 to generate a value of a third pixel PX3. Because a value of the second pixel PX2 is "0", the value of the first pixel PX1 and the value of the third pixel PX3 may be the same.

A pixel value of the compensated second image CI2 corresponding to a pixel of the calibration image CI having a calibration value which is not "0", may be different from a corresponding pixel value of the second image I2 by +1 or −1. That is, the compensation module 122 may sum a value of a fourth pixel PX4 and a value of a fifth pixel PX5 to generate a value of a sixth pixel PX6. Because a value of the fifth pixel PX5 is one of +1 or −1, the value of the fourth pixel PX4 and the value of the sixth pixel PX6 may be different.

Figure 14:
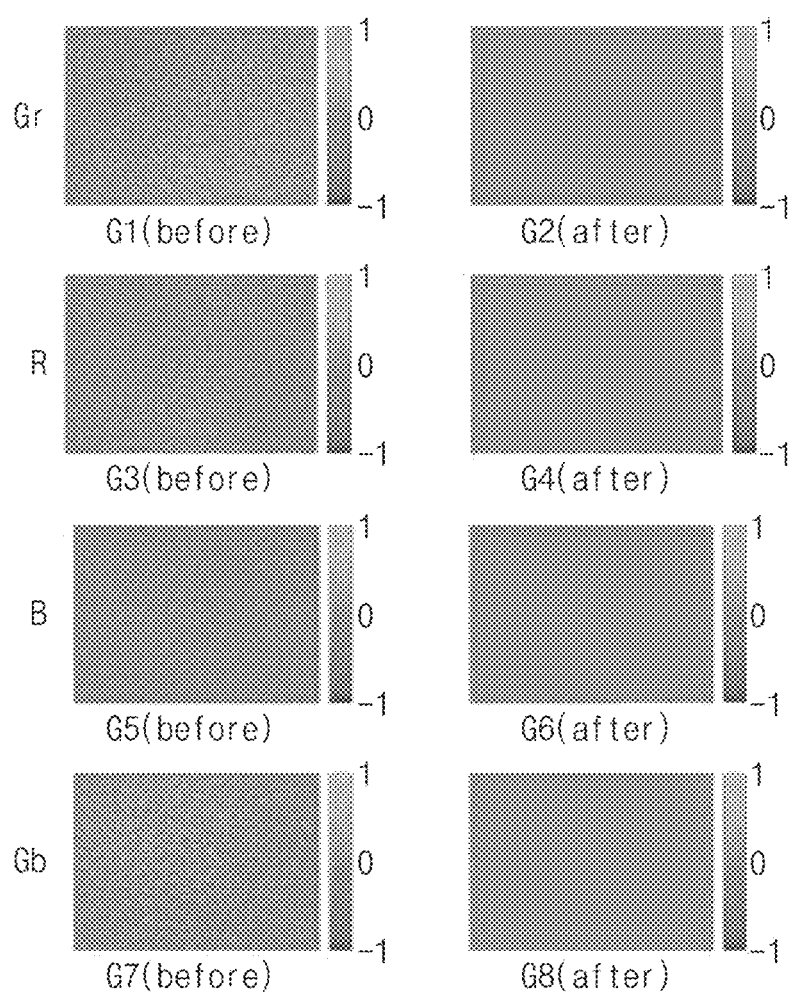
FIGS. 14 and 15 illustrate images showing improvement through a compensation operation according to embodiments of the inventive concepts.

FIG. 14 illustrates a diagram showing improvement through a compensation operation according to embodiments of the inventive concepts. Referring to FIG. 14, first and second graphs G1 and G2 are graphs associated with a green color Gr. Third and fourth graphs G3 and G4 are graphs associated with a red color "R". Fifth and sixth graphs G5 and G6 are graphs associated with a blue color "B". Seventh and eighth graphs G7 and G8 are graphs associated with a green color "Gb".

Each of graphs G1, G3, G5, and G7 represents a difference between corresponding color grid data (or corresponding color code levels) of the first image I1 and the second image I2. Each of graphs G2, G4, G6, and G7 represents a difference between corresponding color grid data (or corresponding color code levels) of the first image I1 and the compensated second image CI2. The grid data are described above, and thus additional description will be omitted to avoid redundancy.

For example, graph G1 shows a difference between first green grid data GD1_Gr and second green grid data GD2_Gr. Graph G2 shows a difference between first green grid data GD1_Gr and compensated second green grid data.

In each graph, a code level difference is expressed by color in units of grid. A green color represents the case where a code difference is 0, a yellow color represents the case where a code difference is 1, and a violet represents the case where a code difference is −1. Referring to graphs G1, G3, G5, and G7, it may be understood that a code level difference between the first image I1 and the second image I2 is between −1 and 1. Even though a code difference is between −1 and 1, with regard to a low-illuminance area, because various gains are multiplied at the image signal processor 120, finally, a color tone difference between a binning image and a second image is noticeable.

On the other hand, referring to graphs G2, G4, G6, and G8, it may be understood that a code level difference is almost 0. That is, graphs G2, G4, G6 and G8 are noticeably green, indicative of a code level difference being close or at to "0". Through the calibration and compensation operations, a code level difference between the first image and the compensated second image may converge into 0.

Figure 15:
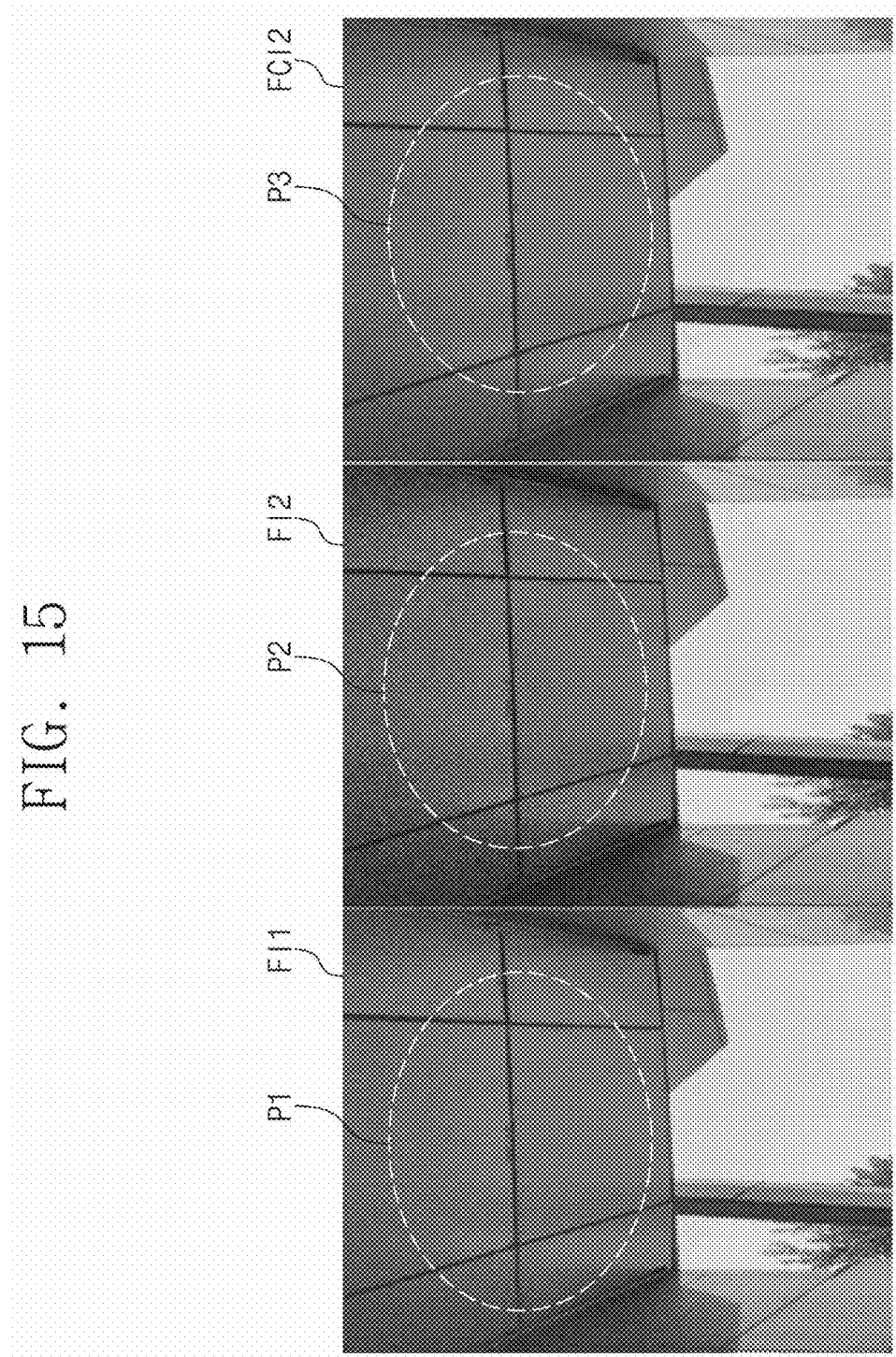

FIG. 15 illustrates a diagram showing improvement through a compensation operation according to an embodiment of the present disclosure. Referring to FIG. 15, comparing final images of the first mode and the second mode, a color tone difference may occur in a low-illuminance area. For example, comparing a first portion P1 and a second portion P2, it may be confirmed that a color tone difference is noticeable unlike the remaining area (i.e., the remaining area other than P1 and P2).

On the other hand, comparing a final image FI1 of the first mode and a compensated final image FCI2 of the second mode in which the calibration operation and the compensation operation are performed, it may be confirmed that a color tone difference decreases or becomes better. Comparing the first portion P1 and a third portion P3, it may be confirmed that a color tone difference decreases.

By performing compensation based on calibration data, in each grid, a grid data difference for each color does not exist between the first image and the compensated second image, or may decrease. Accordingly, an LCL characteristic may be improved. This may mean that a color tone difference of the first image and the compensated second image does not occur. That is, an imaging device may provide an improved image.

Figure 16A:
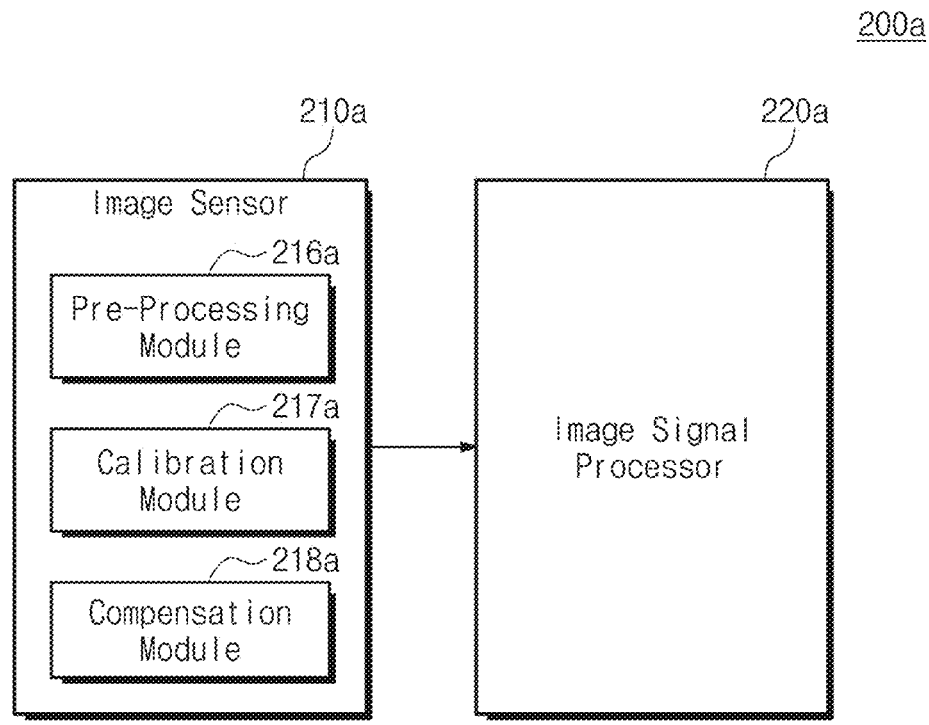
FIGS. 16A, 16B, 16C, 16D, 16E, 16F and 16G illustrate block diagrams of imaging devices according to embodiments of the inventive concepts.

FIGS. 16A to 16G illustrate block diagrams of imaging devices according to embodiments of the inventive concepts. Referring to FIG. 16A, an imaging device 200a may include an image sensor 210a and an image signal processor 220a. Unlike the image sensor 110 described above, the image sensor 210a may be configured to output a compensated second image. That is, the image sensor 210a may include a pre-processing module 216a, a calibration module 217a, and a compensation module 218a. Based on the scheme described with reference to FIGS. 5 to 15, the calibration module 217a may perform the calibration operation, and the compensation module 218a may perform the compensation operation.

Unlike the image signal processor 120 described above, the image signal processor 220a may be configured to receive the compensated second image. That is, the image signal processor 220a of FIG. 16A may not include a calibration module configured to generate calibration data and a compensation module configured to generate a compensated second image.

Figure 16B:
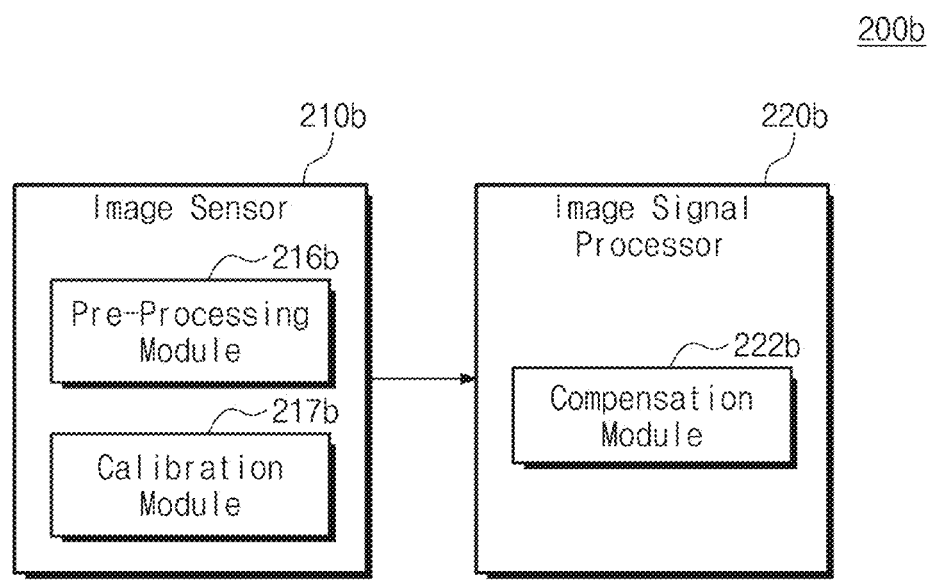

Referring to FIG. 16B, an imaging device 200b may include an image sensor 210b and an image signal processor 220b. Unlike the image sensor 110 described above, the image sensor 210b may be configured to generate calibration data. That is, the image sensor 210b may include a pre-processing module 216b, and a calibration module 217b configured to generate calibration data. Based on the scheme described with reference to FIGS. 5 to 15, the calibration module 217b may perform the calibration operation.

Unlike the image signal processor 120 described above, the image signal processor 220b may not include a calibration module configured to generate calibration data and may include a compensation module 222b configured to generate a compensated second image.

Figure 16C:
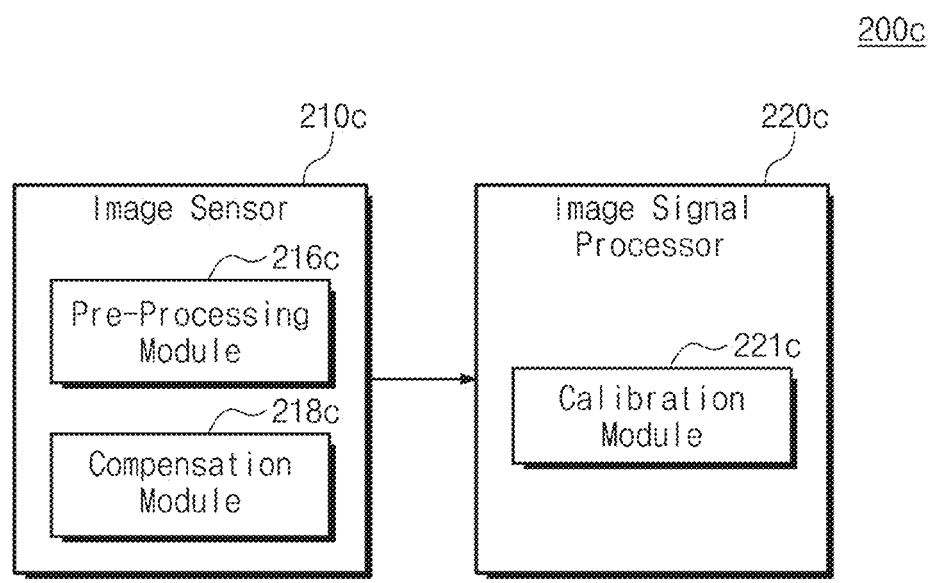

Referring to FIG. 16C, an imaging device 200c may include an image sensor 210c and an image signal processor 220c. Unlike the image sensor 110 described above, the image sensor 210c may be configured to output a compensated second image. That is, the image sensor 210c may include a pre-processing module 216c, and a compensation module 218c configured to generate a compensated second image. Based on the scheme described with reference to FIGS. 5 to 15, the compensation module 218c may perform the compensation operation.

Unlike the image signal processor 120 described above, the image signal processor 220c may be configured to receive a compensated second image. That is, the image signal processor 220c of FIG. 16C may not include a compensation module configured to generate a compensated second image and may include a calibration module 221c configured to generate calibration data. The calibration data generated by the calibration module 221c may be provided from the image signal processor 220c to the compensation module 218c of the image sensor 210c.

Figure 16D:
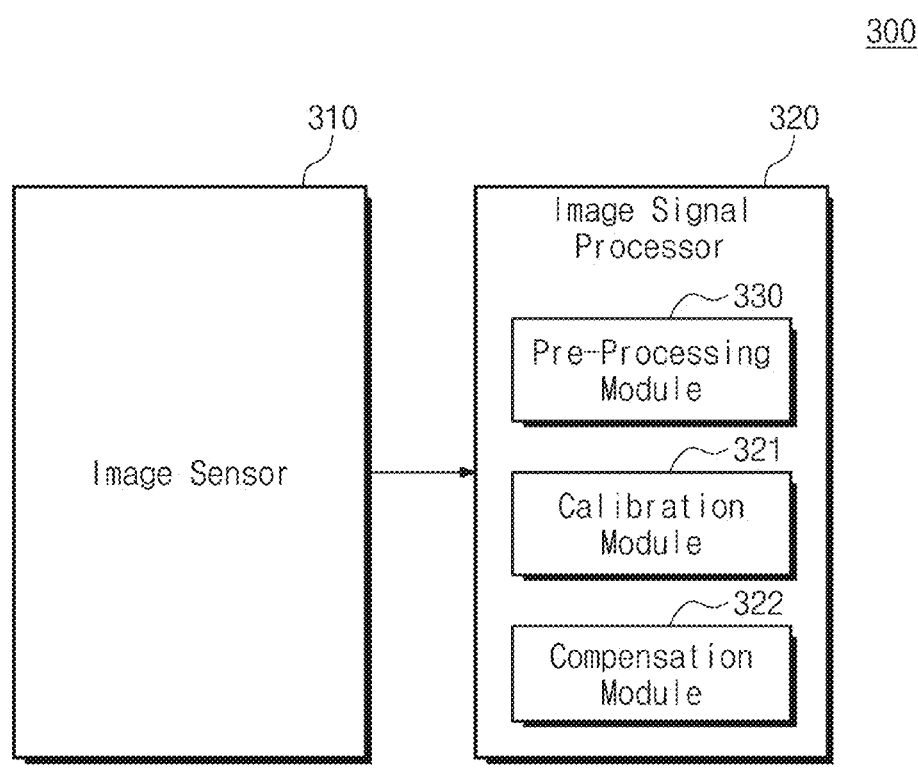

Referring to FIG. 16D, an imaging device 300 may include an image sensor 310 and an image signal processor 320. Unlike the image sensor 110 described above, the image sensor 310 may be configured to output a raw image having a tetra pattern. That is, the image sensor 310 may not include a pre-processing module.

Unlike the image signal processor 120 described above, the image signal processor 320 may be configured to receive a raw image. That is, the image signal processor 320 of FIG. 16D may include a pre-processing module 330 configured to generate a first image and a second image having a Bayer pattern based on the received raw image, a calibration module 321 configured to generate calibration data, and a compensation module 322 configured to generate a compensated second image.

Based on the scheme described with reference to FIGS. 5 to 15, the calibration module 321 may perform the calibration operation, and the compensation module 322 may perform the compensation operation. The pre-processing module 330 may operate in the first mode or the second mode under control of the application processor. For example, the pre-processing module 330 may operate in the first mode in the low-illuminance environment and may operate in the second mode in the high-illuminance environment.

Figure 16E:
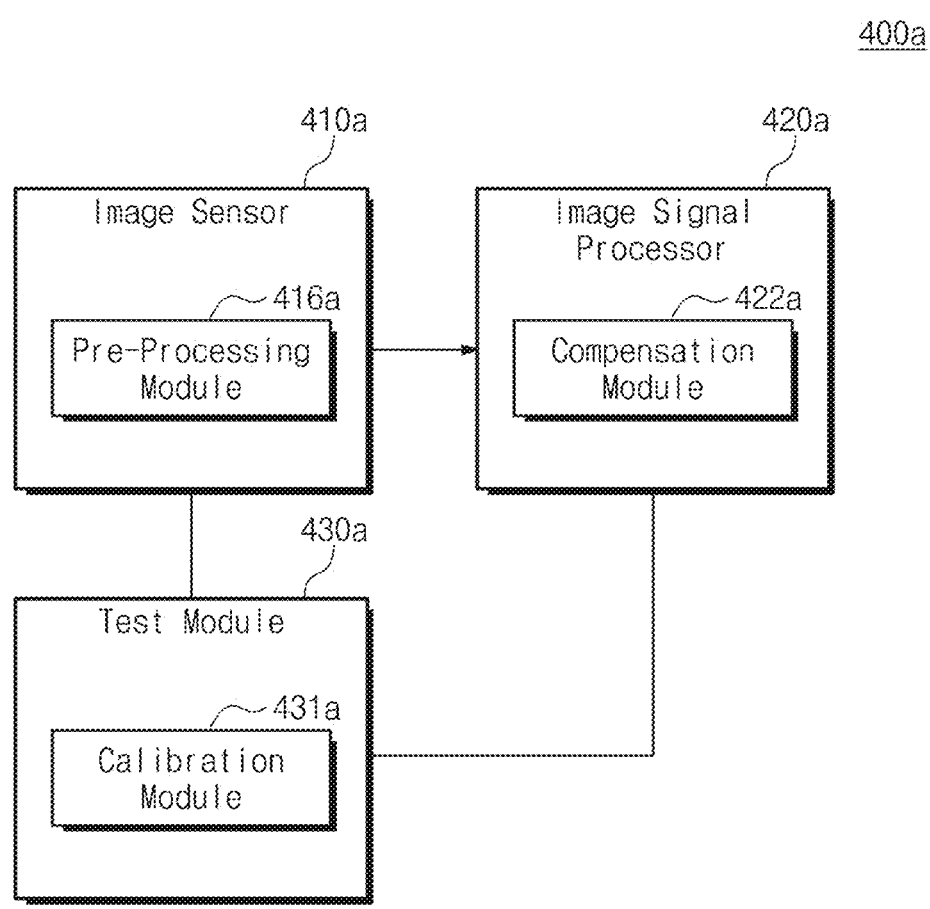

Referring to FIG. 16E, an imaging device 400a may include an image sensor 410a, an image signal processor 420a, and a test module 430a. The image sensor 410a may include a pre-processing module 416a.

Unlike the image signal processor 120 described above, the image signal processor 420a may not perform the calibration operation. That is, the image signal processor 420a of FIG. 16E may include a compensation module 422a, and may not include a calibration module. Based on the scheme described with reference to FIGS. 5 to 15, the compensation module 422a may perform the compensation operation.

Unlike the imaging device 100 of FIG. 1, the imaging device 400a of FIG. 16E may further include the test module 430a. The test module 430a may include a calibration module 431a configured to generate calibration data. Based on the scheme described with reference to FIGS. 5 to 15, the calibration module 431a may perform the calibration operation. The calibration data generated by the calibration module 431a may be provided from the test module 430a to the compensation module 422a of the image signal processor 420a.

Figure 16F:
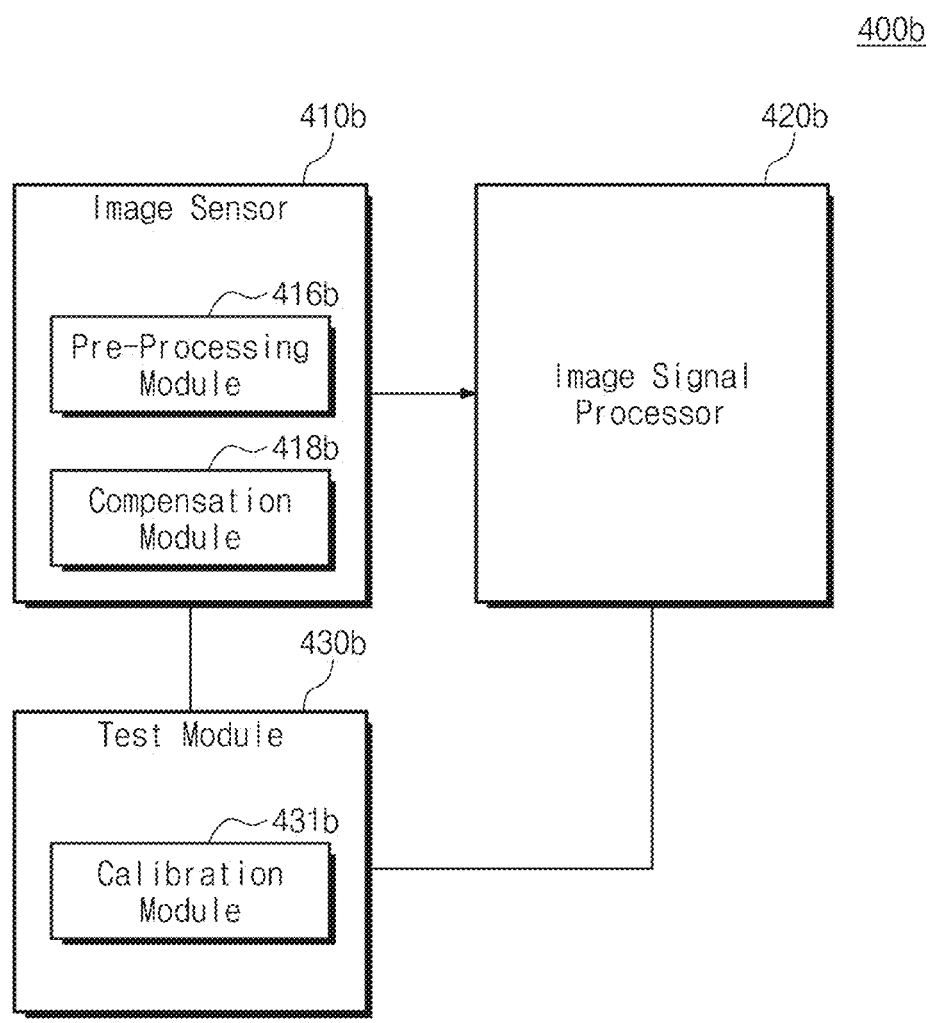

Referring to FIG. 16F, an imaging device 400b may include an image sensor 410b, an image signal processor 420b, and a test module 430b. Unlike the image sensor 110 described above, the image sensor 410b may be configured to output a compensated second image. That is, the image sensor 410b may include a pre-processing module 416b, and a compensation module 418b configured to generate a compensated second image. Based on the scheme described with reference to FIGS. 5 to 15, the compensation module 418b may perform the compensation operation.

Unlike the image signal processor 120 described above, the image signal processor 420b may be configured to receive a compensated second image. That is, the image signal processor 420b of FIG. 16F may not include a compensation module and a calibration module.

Unlike the imaging device 100 of FIG. 1, the imaging device 400b of FIG. 16F may further include the test module 430b. The test module 430b may include a calibration module 431b configured to generate calibration data. Based on the scheme described with reference to FIGS. 5 to 15, the calibration module 431b may perform the calibration operation. The calibrated data generated by the calibration module 431b may be provided from the test module 430b to the compensation module 418b of the image sensor 410b.

Figure 16G:
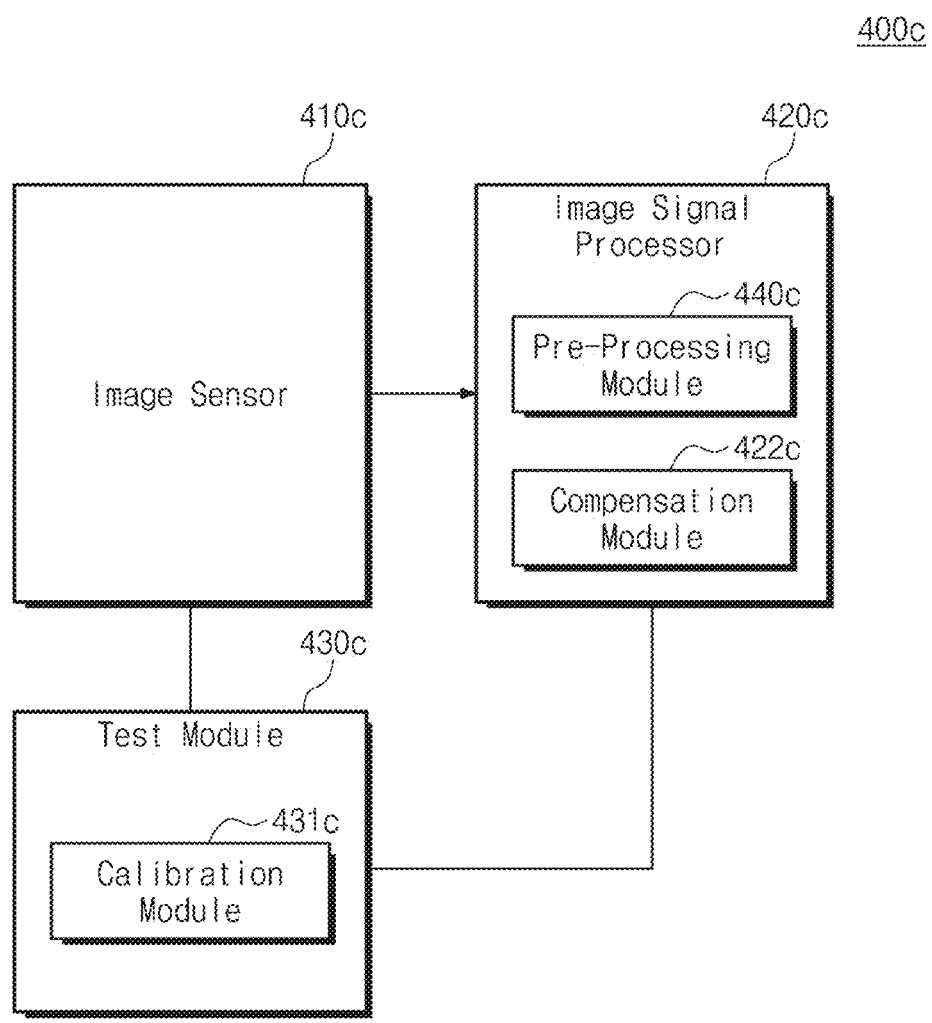

Referring to FIG. 16G, an imaging device 400c may include an image sensor 410c, an image signal processor 420c, and a test module 430c. Unlike the image sensor 110 described above, the image sensor 410c may be configured to output a raw image. That is, the image sensor 410c may not include a pre-processing module.

Unlike the image signal processor 120 described above, the image signal processor 420c may be configured to receive a raw image. That is, the image signal processor 420c of FIG. 16G may include a pre-processing module 440c configured to generate a first image or a second image, and a compensation module 422c configured to generate a compensated second image. The image signal processor 420c may not include a calibration module configured to generate calibration data. Based on the scheme described with reference to FIGS. 5 to 15, the compensation module 422c may perform the compensation operation.

Unlike the imaging device 100 of FIG. 1, the imaging device 400c of FIG. 16G may further include the test module 430c. The test module 430c may include a calibration module 431c configured to generate calibration data. Based on the scheme described with reference to FIGS. 5 to 15, the calibration module 431c may perform the calibration operation. The calibrated data generated by the calibration module 431c may be provided from the test module 430c to the compensation module 422c of the image signal processor 420c.

Figure 17:
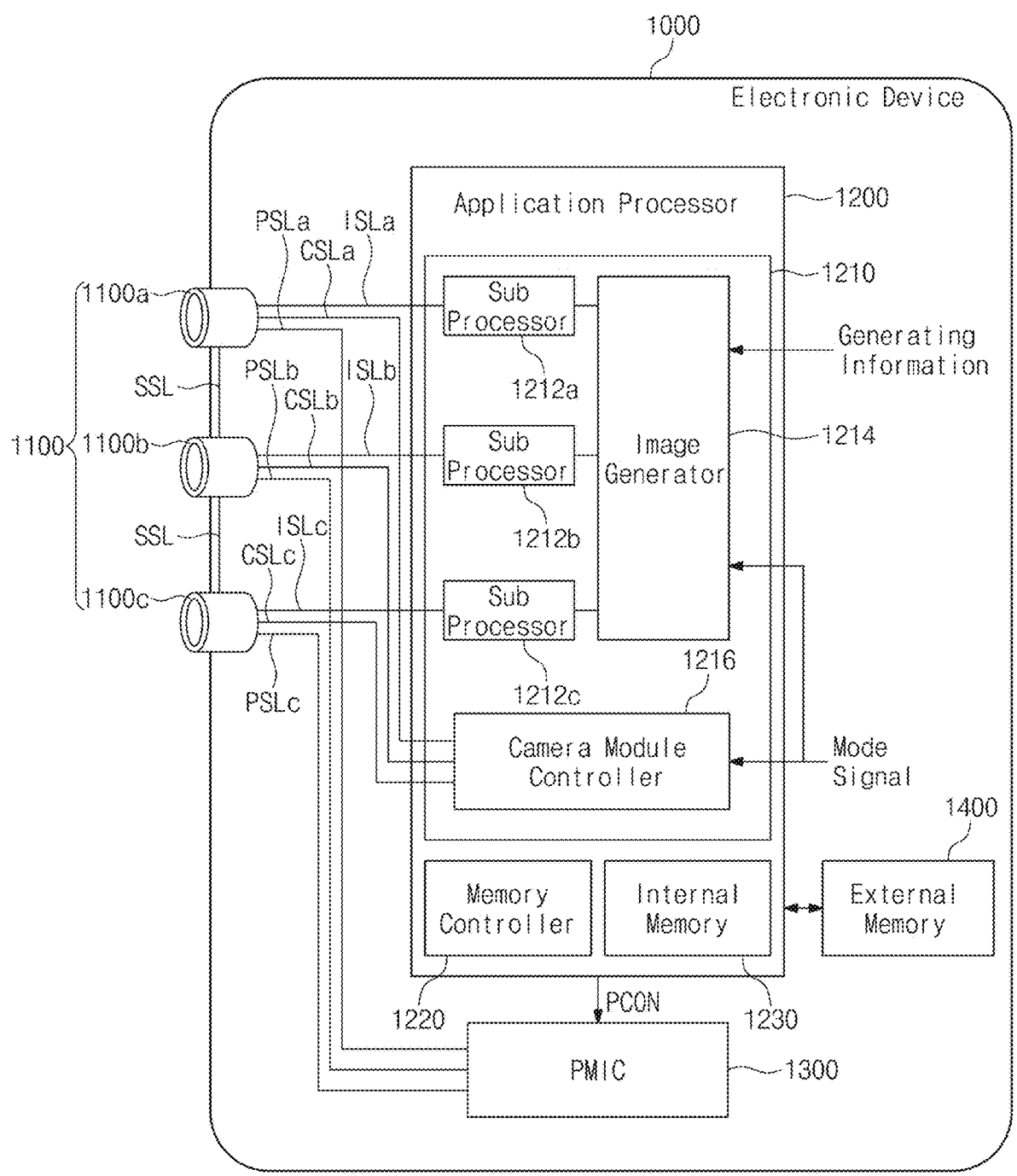
FIG. 17 illustrates a configuration of an electronic device including a multi-camera module according to embodiments of the inventive concepts.
Figure 18:
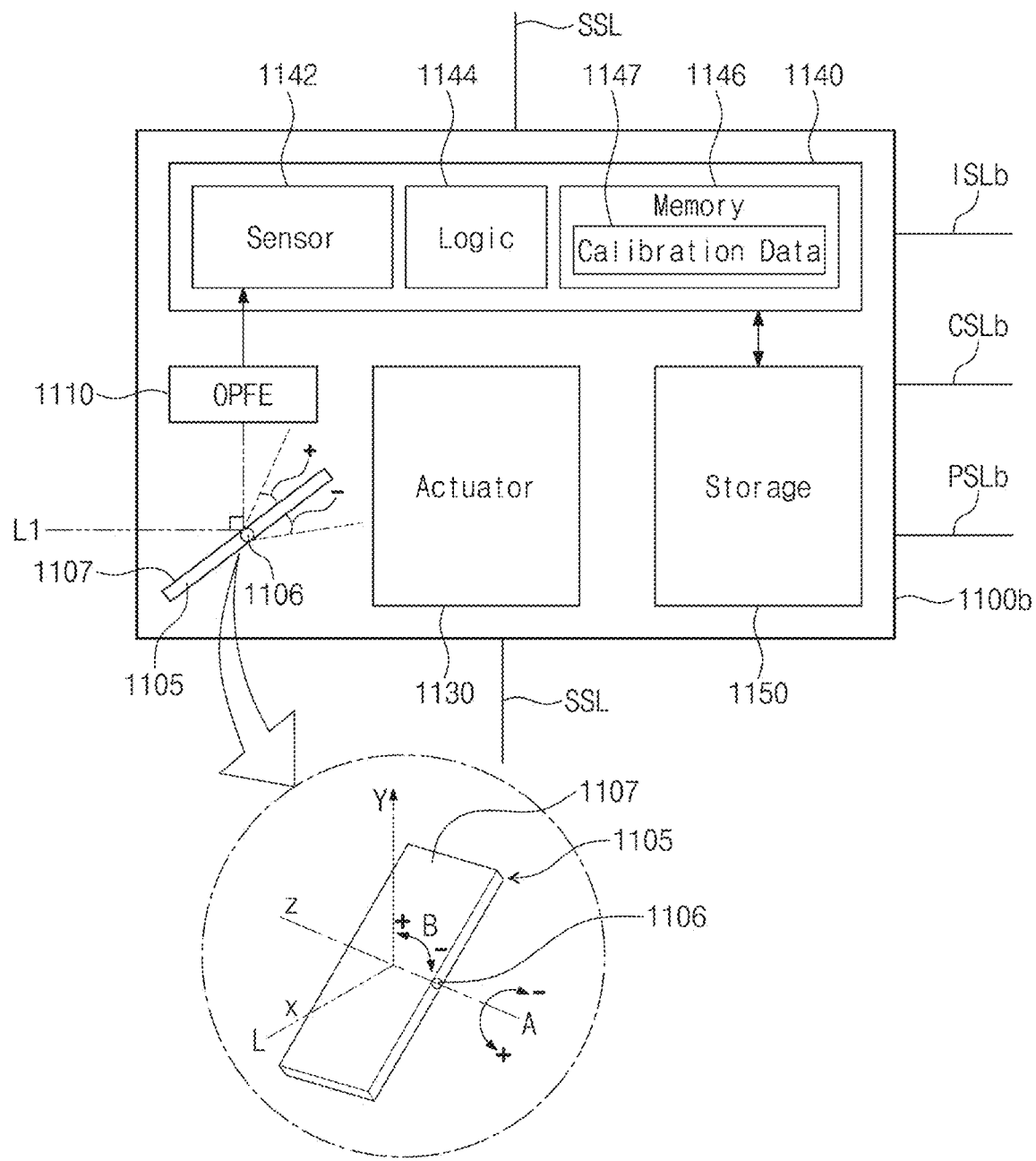
FIG. 18 illustrates a configuration of a camera module of FIG. 17.

FIG. 17 illustrates a configuration of an electronic device including a multi-camera module according to embodiments of the inventive concepts. FIG. 18 illustrates a configuration of a camera module of FIG. 17.

Referring to FIG. 17, an electronic device 1000 may include a camera module group 1100, an application processor 1200, a PMIC (power management integrated circuit) 1300, and an external memory 1400.

The camera module group 1100 may include a plurality of camera modules 1100a, 1100b, and 1100c. An electronic device including three camera modules 1100a, 1100b, and 1100c is illustrated in FIG. 17, but the inventive concepts are not limited thereto. In some embodiments, the camera module group 1100 may be modified to include only two camera modules. Also, in some embodiments, the camera module group 1100 may be modified to include "n" camera modules (n being a natural number of 4 or more).

Below, a detailed configuration of the camera module 1100b will be more fully described with reference to FIG. 18. However, the following description may be equally applied to the remaining camera modules 1100a and 1100c.

Referring to FIG. 18, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some embodiments, the prism 1105 may change a path of the light "L" incident in a first direction "X" to a second direction "Y" perpendicular to the first direction "X". Also, the prism 1105 may change the path of the light "L" incident in the first direction "X" to the second direction "Y" perpendicular to the first direction "X" by rotating the reflecting plane 1107 of the light reflecting material in direction "A" about a central axis 1106, or rotating the central axis 1106 in direction "B". In this case, the OPFE 1110 may move in a third direction "Z" perpendicular to the first direction "X" and the second direction "Y".

In some embodiments, as illustrated, a maximum rotation angle of the prism 1105 in direction "A" may be equal to or smaller than 15 degrees in a positive A direction and may be greater than 15 degrees in a negative A direction, but the inventive concepts are not limited thereto.

In some embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100b. For example, when a default optical zoom ratio of the camera module 1100b is "Zr", the optical zoom ratio of the camera module 1100b may be changed to an optical zoom ratio of 3Zr, 5Zr, or 5Zr or more by moving "m" optical lens included in the OPFE 1110. The OPFE 1110 may further include an optical lens (e.g., an anamophic lens) composed of "n" groups (n being a natural number) on a front surface of the "m" lenses described above.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. In an embodiment, the control logic 1144 may be a logic circuit. The image sensor 1142 may sense an image of a sensing target by using the light "L" provided through an optical lens. The control logic 1144 may control overall operations of the camera module 1100b. For example, the control logic 1144 may control an operation of the camera module 1100b based on a control signal provided through a control signal line CSLb. In addition, the control logic 1144 may include a calibration module configured to perform the calibration operation and a compensation module configured to perform the compensation operation, which are described with reference to FIGS. 1 to 15.

The memory 1146 may store information, which is necessary for an operation of the camera module 1100b, such as calibration data 1147. The calibration data 1147 may include information necessary for the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing. The calibration data 1147 may include data (e.g., calibration data, offset data, grid data, decoding information, or a calibration image) necessary for the calibration operation and the compensation operation described with reference to FIGS. 1 to 15.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some embodiments, the storage 1150 may be implemented with an electrically erasable programmable read only memory (EEPROM), but the inventive concepts are not limited thereto.

Referring together to FIGS. 17 and 18, in some embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100*a* and 1100*c*) may be a vertical shape of camera module in which the prism 1105 and the OPFE 1110 described above are not included. However, the inventive concepts are not limited thereto.

In some embodiments, one camera module (e.g., 1100*c*) among the plurality of camera modules 1100*a*, 1100*b*, and 1100*c* may be, for example, a vertical shape of depth camera extracting depth information by using an infrared ray (IR). In this case, the application processor 1200 may merge image data provided from the depth camera and image data provided from any other camera module (e.g., 1100*a* or 1100*b*) and may generate a three-dimensional (3D) depth image.

In some embodiments, at least two camera modules (e.g., 1100*a* and 1100*b*) among the plurality of camera modules 1100*a*, 1100*b*, and 1100*c* may have different fields of view. In this case, the at least two camera modules (e.g., 1100*a* and 1100*b*) among the plurality of camera modules 1100*a*, 1100*b*, and 1100*c* may include different optical lens. However, the inventive concepts are not limited thereto.

Also, in some embodiments, fields of view of the plurality of camera modules 1100*a*, 1100*b*, and 1100*c* may be different. In this case, the plurality of camera modules 1100*a*, 1100*b*, and 1100*c* may include different optical lens. However, the inventive concepts are not limited thereto. In some embodiments, the plurality of camera modules 1100*a*, 1100*b*, and 1100*c* may be disposed to be physically separated from each other. That is, the plurality of camera modules 1100*a*, 1100*b*, and 1100*c* may not use a sensing area of one image sensor 1142, but the plurality of camera modules 1100*a*, 1100*b*, and 1100*c* may include independent image sensors 1142 therein, respectively.

Returning to FIG. 17, the application processor 1200 may include an image processing device 1210, a memory controller 1220, and an internal memory 1230. The application processor 1200 may be implemented to be separated from the plurality of camera modules 1100*a*, 1100*b*, and 1100*c*. For example, the application processor 1200 and the plurality of camera modules 1100*a*, 1100*b*, and 1100*c* may be implemented with separate semiconductor chips. In some embodiments, the application processor 1200 may include a calibration module configured to perform the calibration operation and a compensation module configured to perform the compensation operation, which are described with reference to FIGS. 1 to 15.

The image processing device 1210 may include the plurality of sub image processors (sub processors) 1212*a*, 1212*b*, and 1212*c*, the number of which corresponds to the number of the plurality of camera modules 1100*a*, 1100*b*, and 1100*c*.

Image data respectively generated from the camera modules 1100*a*, 1100*b*, and 1100*c* may be respectively provided to the corresponding sub image processors 1212*a*, 1212*b*, and 1212*c* through separated image signal lines ISLa, ISLb, and ISLc. For example, the image data generated from the camera module 1100*a* may be provided to the sub image processor 1212*a* through the image signal line ISLa, the image data generated from the camera module 1100*b* may be provided to the sub image processor 1212*b* through the image signal line ISLb, and the image data generated from the camera module 1100*c* may be provided to the sub image processor 1212*c* through the image signal line ISLc. This image data transmission may be performed, for example, by using a camera serial interface (CSI) based on the MIPI® (Mobile Industry Processor Interface), however the inventive concepts are not limited thereto.

Meanwhile, in some embodiments, one sub image processor may be disposed to correspond to a plurality of camera modules. For example, the sub image processor 1212*a* and the sub image processor 1212*c* may be integrally implemented, not separated from each other as illustrated in FIG. 12. In this case, one of the pieces of image data respectively provided from the camera module 1100*a* and the camera module 1100*c* may be selected through a selection element (e.g., a multiplexer), and the selected image data may be provided to the integrated sub image processor.

The image data respectively provided to the sub image processors 1212*a*, 1212*b*, and 1212*c* may be provided to an image generator 1214. The image generator 1214 may generate an output image by using the image data respectively provided from the sub image processors 1212*a*, 1212*b*, and 1212*c*, depending on image generating information Generating Information or a mode signal.

In detail, the image generator 1214 may generate the output image by merging at least a portion of the image data respectively generated from the camera modules 1100*a*, 1100*b*, and 1100*c* having different fields of view, depending on the image generating information Generating Information or the mode signal. Also, the image generator 1214 may generate the output image by selecting one of the image data respectively generated from the camera modules 1100*a*, 1100*b*, and 1100*c* having different fields of view, depending on the image generating information Generating Information or the mode signal.

In some embodiments, the image generating information Generating Information may include a zoom signal or a zoom factor. Also, in some embodiments, the mode signal may be, for example, a signal based on a mode selected from a user.

In the case where the image generating information Generating Information is the zoom signal (or zoom factor) and the camera modules 1100*a*, 1100*b*, and 1100*c* have different visual fields of view, the image generator 1214 may perform different operations depending on a kind of the zoom signal. For example, in the case where the zoom signal is a first signal, the image generator 1214 may merge the image data output from the camera module 1100*a* and the image data output from the camera module 1100*c*, and may generate the output image by using the merged image signal and the image data output from the camera module 1100*b* that is not used in the merging operation. In the case where the zoom signal is a second signal different from the first signal, without the image data merging operation, the image generator 1214 may select one of the image data respectively output from the camera modules 1100*a*, 1100*b*, and 1100*c* and may output the selected image data as the output image. However, the inventive concepts are not limited thereto, and the way in which image data is processed may be modified without limitation if necessary.

In some embodiments, the image generator 1214 may generate merged image data having an increased dynamic range by receiving a plurality of image data of different exposure times from at least one of the plurality of sub image processors 1212*a*, 1212*b*, and 1212*c* and performing high dynamic range (HDR) processing on the plurality of image data. Also, in some embodiments, the image generator 1214 may generate an image where a color tone difference from a final image generated in a first mode decreases, by performing a compensation operation on a second image.

A camera module controller 1216 may provide control signals to the camera modules 1100*a*, 1100*b*, and 1100*c*, respectively. The control signals generated from the camera module controller 1216 may be respectively provided to the corresponding camera modules 1100*a*, 1100*b*, and 1100*c* through control signal lines CSLa, CSLb, and CSLc separated from each other.

One of the plurality of camera modules 1100*a*, 1100*b*, and 1100*c* may be designated as a master camera (e.g., 1100*b*) depending on the image generating information Generating Information including a zoom signal or the mode signal, and the remaining camera modules (e.g., 1100*a* and 1100*c*) may be designated as a slave camera. The above designation information may be included in the control signals, and the control signals including the designation information may be respectively provided to the corresponding camera modules 1100*a*, 1100*b*, and 1100*c* through the control signal lines CSLa, CSLb, and CSLc separated from each other.

Camera modules operating as a master and a slave may be changed depending on the zoom factor or an operating mode signal. For example, in the case where the field of view of the camera module 1100*a* is wider than the field of view of the camera module 1100*b* and the zoom factor indicates a low zoom ratio, the camera module 1100*b* may operate as a master, and the camera module 1100*a* may operate as a slave. In contrast, in the case where the zoom factor indicates a high zoom ratio, the camera module 1100*a* may operate as a master, and the camera module 1100*b* may operate as a slave.

In some embodiments, the control signal provided from the camera module controller 1216 to each of the camera modules 1100*a*, 1100*b*, and 1100*c* may include a sync enable signal. For example, in the case where the camera module 1100*b* is used as a master camera and the camera modules 1100*a* and 1100*c* are used as a slave camera, the camera module controller 1216 may transmit the sync enable signal to the camera module 1100*b*. The camera module 1100*b* that is provided with sync enable signal may generate a sync signal based on the provided sync enable signal and may provide the generated sync signal to the camera modules 1100*a* and 1100*c* through a sync signal line SSL. The camera module 1100*b* and the camera modules 1100*a* and 1100*c* may be synchronized with the sync signal to transmit image data to the application processor 1200.

In some embodiments, the control signal provided from the camera module controller 1216 to each of the camera modules 1100*a*, 1100*b*, and 1100*c* may include mode information according to the mode signal. Based on the mode information, the plurality of camera modules 1100*a*, 1100*b*, and 1100*c* may operate in a first operating mode and a second operating mode with regard to a sensing speed.

In the first operating mode, the plurality of camera modules 1100*a*, 1100*b*, and 1100*c* may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212*a*, 1212*b*, and 1212*c* of the image processing device 1210 may perform decoding and may also perform image processing on the decoded image signal.

In the second operating mode, the plurality of camera modules 1100*a*, 1100*b*, and 1100*c* may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply power, for example, power supply voltages to the plurality of camera modules 1100*a*, 1100*b*, and 1100*c*, respectively. For example, under control of the application processor 1200, the PMIC 1300 may supply a first power to the camera module 1100*a* through a power signal line PSLa, may supply a second power to the camera module 1100*b* through a power signal line PSLb, and may supply a third power to the camera module 1100*c* through a power signal line PSLc.

In response to a power control signal PCON from the application processor 1200, the PMIC 1300 may generate power corresponding to each of the plurality of camera modules 1100*a*, 1100*b*, and 1100*c* and may adjust a level of the power. The power control signal PCON may include a power adjustment signal for each operating mode of the plurality of camera modules 1100*a*, 1100*b*, and 1100*c*. For example, the operating mode may include a low-power mode. In this case, the power control signal PCON may include information about a camera module operating in the low-power mode and a set power level. Levels of the power respectively provided to the plurality of camera modules 1100*a*, 1100*b*, and 1100*c* may be identical to each other or may be different from each other. Also, a level of a power may be dynamically changed.

According to the inventive concepts, a color tone difference of an image of a first mode and an image of a second mode may be improved. In particular, calibration data generated in a manufacturing process may be stored in a memory, and a remosaic compensation operation may be performed based on the calibration data after performing a remosaic operation.

While the inventive concepts have been described with reference to embodiments thereof, it should be apparent to those of ordinary skill in the art that various changes and modifications may be made thereto without departing from the spirit and scope of the inventive concepts as set forth in the following claims.

What is claimed is:

1. An imaging device comprising:
   a pre-processing module configured to generate a first image by performing a binning operation based on a raw image in a first mode and to generate a second image by performing a remosaic operation based on the raw image in a second mode;
   a calibration module configured to generate calibration data based on a first image associated with a first raw image and a second image associated with a second raw image, the calibration data including a code level difference of the first image and the second image for each of a plurality of colors by a grid unit; and
   a compensation module configured to receive a second image associated with a third raw image, to generate a calibration image by decoding the calibration data, and to generate a compensated second image associated with the third raw image by summing the second image associated with the third raw image and the calibration image to compensate for a color tone difference between the first mode and the second mode by the grid unit, wherein the calibration module is configured to compensate a code level difference due to the remosaic operation in the second mode by the grid unit, based on the calibration data, so that the color tone difference of a low-illuminance region of the second image associated with the third raw image is improved.

2. The imaging device of claim 1, further comprising a memory, wherein the calibration module is configured to store the calibration data in the memory, and the compensation module is configured to load the calibration data from the memory.

3. The imaging device of claim 1, further comprising a pixel array, wherein the pixel array comprises:
   a first pixel group including pixels sharing a first floating diffusion region;
   a second pixel group including pixels sharing a second floating diffusion region;
   a third pixel group including pixels sharing a third floating diffusion region;
   a first color filter on the first pixel group and configured to pass first light of a first color;
   a second color filter on the second pixel group and configured to pass second light of a second color; and
   a third color filter on the third pixel group and configured to pass third light of a third color.

4. The imaging device of claim 1, wherein the calibration module is configured to calculate a difference between pixel average values of the first image associated with the first raw image and the second image associated with the second raw image for each color by the grid unit, to generate the calibration data.

5. The imaging device of claim 1, wherein the first image associated with the first raw image is divided into a plurality of first grids, the second image associated with the second raw image is divided into a plurality of second grids, and the plurality of first grids respectively correspond to the plurality of second grids, and wherein the calibration data include a plurality of sub-calibration data corresponding to the plurality of first grids and the plurality of second grids, and each of the plurality of sub-calibration data includes a plurality of color sub-calibration data.

6. The imaging device of claim 1, wherein the compensation module is configured to randomly select compensation pixel positions by using a hash function based on the calibration data to generate the calibration image.

7. The imaging device of claim 1, wherein the compensation module is configured to decode the calibration data to generate decoding information and generate the calibration image based on the decoding information, wherein the decoding information includes a plurality of sub-decoding information respectively corresponding to a plurality of grids, wherein each of the plurality of sub-decoding information includes a plurality of color sub-decoding information, and wherein each of the plurality of sub-decoding information comprises sign information, number information about pixels targeted for compensation, and position information about the pixels targeted for compensation.

8. An operation method of an imaging device that includes an image sensor and an image signal processor, the image sensor including a pre-processing module, and the image signal processor including a calibration module and a compensation module, the method comprising:
   receiving, by the pre-processing module, a first raw image; and
   performing, by the pre-processing module, a remosaic operation on the first raw image to generate a second image associated with the first raw image, wherein a resolution of the second image associated with the first raw image is identical to a resolution of the first raw image;
   receiving, by the compensation module, a second image associated with a first raw image;
   loading, by the compensation module, calibration data, the calibration data including a code level difference of a first image and a second image for each of a plurality of colors by grid units;
   decoding, by the compensation module, the calibration data to generate a calibration image; and
   summing, by the compensation module, the second image associated with the first raw image and the calibration image to generate a compensated second image associated with the first raw image so that a color tone difference between a first mode and a second mode is compensated by the grid units.

9. The method of claim 8, wherein said decoding the calibration data comprises:
   generating decoding information based on the calibration data; and
   generating the calibration image based on the decoding information,
   wherein said generating the decoding information comprises determining sign information,
   determining a number of pixels targeted for compensation, and
   determining positions of the pixels targeted for the compensation.

10. The method of claim 9, wherein said determining the positions comprises randomly determining the positions of the pixels targeted for compensation by using a seed.

11. The method of claim 8, further comprising generating, by the calibration module, the calibration data.

12. The method of claim 11, wherein said generating the calibration data comprises:
   obtaining a first image associated with a second raw image;
   obtaining a second image associated with a third raw image;
   generating the calibration data based on the first image associated with the second raw image and the second image associated with the third raw image; and
   storing the calibration data in a memory.

13. The method of claim 12, wherein said generating the calibration data comprises:
   calculating first grid data corresponding to an average value for each color of the first image associated with the second raw image for every grid;
   calculating second grid data corresponding to an average value for each color of the second image associated with the third raw image for every grid; and
   subtracting the second grid data from the first grid data to generate the calibration data.

14. The method of claim 13, wherein said subtracting the second grid data from the first grid data comprises:
   subtracting the second grid data and the first grid data to generate offset data; and
   dividing the offset data by a given value to generate the calibration data, wherein the given value corresponds to a reciprocal of a number of pixels of a same color included in a grid of the second image associated with the third raw image.

15. An operation method of an imaging device, the method comprising:
receiving, by a calibration module, a first image associated with a first raw image and a second image associated with a second raw image;
generating, by the calibration module, a plurality of calibration data based on the first image associated with the first raw image and the second image associated with the second raw image, the plurality of calibration data including a code level difference of the first image associated with the first raw image and the second image associated with the second raw image for each of a plurality of colors by a grid unit;
storing, by the calibration module, the plurality of calibration data in a memory;
receiving, by a compensation module, a second image associated with a third raw image provided from a pre-processing module;
loading, by the compensation module, the plurality of calibration data stored in the memory;
decoding the plurality of calibration data to generate a calibration image; and
generating a compensated second image associated with the third raw image so that a color tone difference between a first mode and a second mode is compensated by the grid unit, based on the calibration image and the second image associated with the third raw image,
wherein said generating the plurality of calibration data comprises:
calculating first sub-grid data associated with a first sub-grid among a plurality of first grids of the first image associated with the first raw image;
calculating second sub-grid data associated with a second sub-grid among a plurality of second grids of the second image associated with the second raw image; and
generating first calibration data among the plurality of calibration data based on the first sub-grid data and the second sub-grid data.

16. The method of claim 15, wherein said generating the first calibration data comprises:
subtracting first color grid data of the second sub-grid data from first color grid data of the first sub-grid data to generate first color calibration data of the first calibration data; and
subtracting second color grid data of the second sub-grid data from second color grid data of the first sub-grid data to generate second color calibration data of the first calibration data,
wherein the first color grid data of the first sub-grid data correspond to an average value of a plurality of pixels corresponding to a first color included in the first sub-grid, and the second color grid data of the first sub-grid data correspond to an average value of a plurality of pixels corresponding to a second color included in the first sub-grid, and
wherein the first color grid data of the second sub-grid data correspond to an average value of a plurality of pixels corresponding to the first color included in the second sub-grid, and the second color grid data of the second sub-grid data correspond to an average value of a plurality of pixels corresponding to the second color included in the second sub-grid.

17. The method of claim 16, wherein said decoding the calibration data comprises:
setting a calibration value of pixels to be compensated from among pixels corresponding to the first color included in a first calibration grid from among a plurality of grids of the calibration image, based on the first color calibration data; and
setting a calibration value of pixels to be compensated from among pixels corresponding to the second color included in the first calibration grid, based on the second color calibration data.

* * * * *